(12) United States Patent
Kobayashi et al.

(10) Patent No.: US 7,397,520 B2
(45) Date of Patent: Jul. 8, 2008

(54) ELECTRO-OPTICAL DEVICE AND ELECTRONIC APPARATUS

(75) Inventors: Akio Kobayashi, Shiojiri (JP); Hiroshi Wada, Azumino (JP); Masataka Shiramizu, Azumino (JP); Kenichi Tanaka, Ikeda (JP)

(73) Assignee: Seiko Epson Corporation (JP)

( * ) Notice: Subject to any disclaimer, the term of this patent is extended or adjusted under 35 U.S.C. 154(b) by 402 days.

(21) Appl. No.: 11/294,881

(22) Filed: Dec. 6, 2005

(65) Prior Publication Data

US 2006/0120543 A1 Jun. 8, 2006

(30) Foreign Application Priority Data

Dec. 7, 2004 (JP) .............................. 2004-353657

(51) Int. Cl.
G02F 1/1333 (2006.01)
(52) U.S. Cl. .......................................... 349/58; 349/60
(58) Field of Classification Search .................. 349/58, 349/60
See application file for complete search history.

(56) References Cited

U.S. PATENT DOCUMENTS 6,144,216 A * 11/2000 Kajiwara et al. ............ 324/770
6,729,888 B2 * 5/2004 Imaeda ........................ 439/66
7,282,852 B2 * 10/2007 Tajima et al. ............... 313/497
2004/0047149 A1 * 3/2004 Amano et al. ............... 362/225

FOREIGN PATENT DOCUMENTS

| JP | 05-087597 | 4/1993 |
|----|-----------|--------|
| JP | 05-136591 | 6/1993 |
| JP | 06-066095 | 3/1994 |
| JP | 2000-019491 | 1/2000 |

* cited by examiner

Primary Examiner—Mike Qi
(74) Attorney, Agent, or Firm—Harness, Dickey & Pierce, P.L.C.

(57) ABSTRACT

An electro-optical device is provided which includes a first electro-optical panel, an electronic part that is provided to be adjacent to the first electro-optical panel, a receiving part that is interposed between the first electro-optical panel and the electronic part and receives the first electro-optical panel and the electronic part, a first metal frame that fixes the first electro-optical panel to the receiving part, and a second metal frame that fixes the electronic part together with the first metal frame therebetween. In the electro-optic device, any one of the first and second metal frames is extended toward the other one and has an elastic conductive part, and the conductive part is pressed against the other one by the elastic force and comes into contact with the other one such that the first and second metal frames are electrically connected to each other.

11 Claims, 13 Drawing Sheets

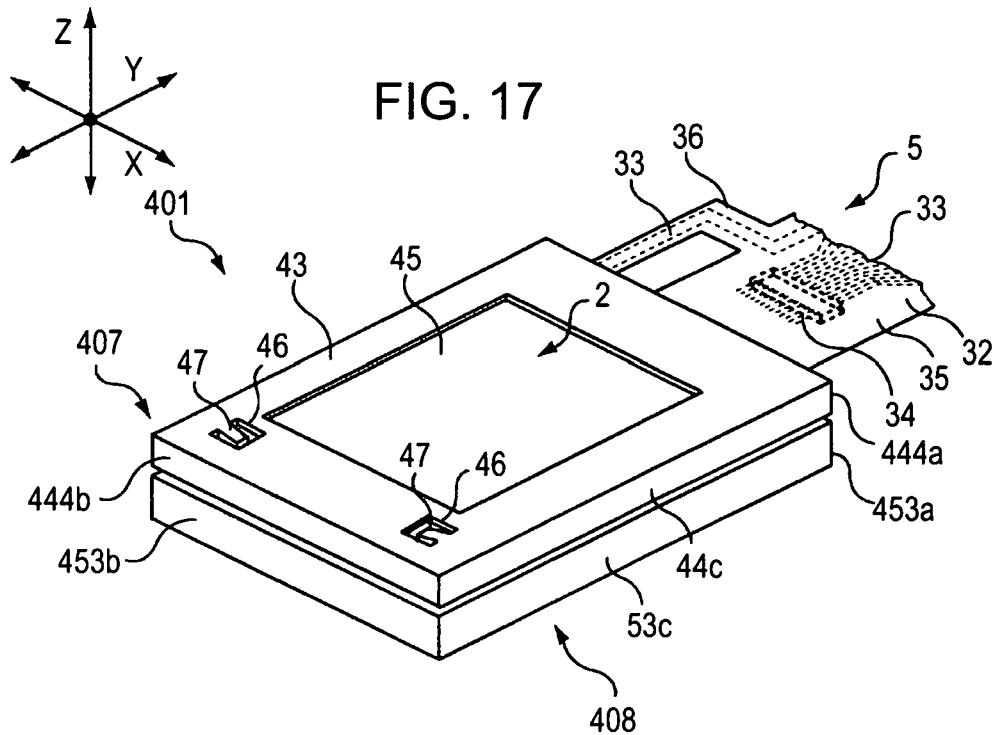
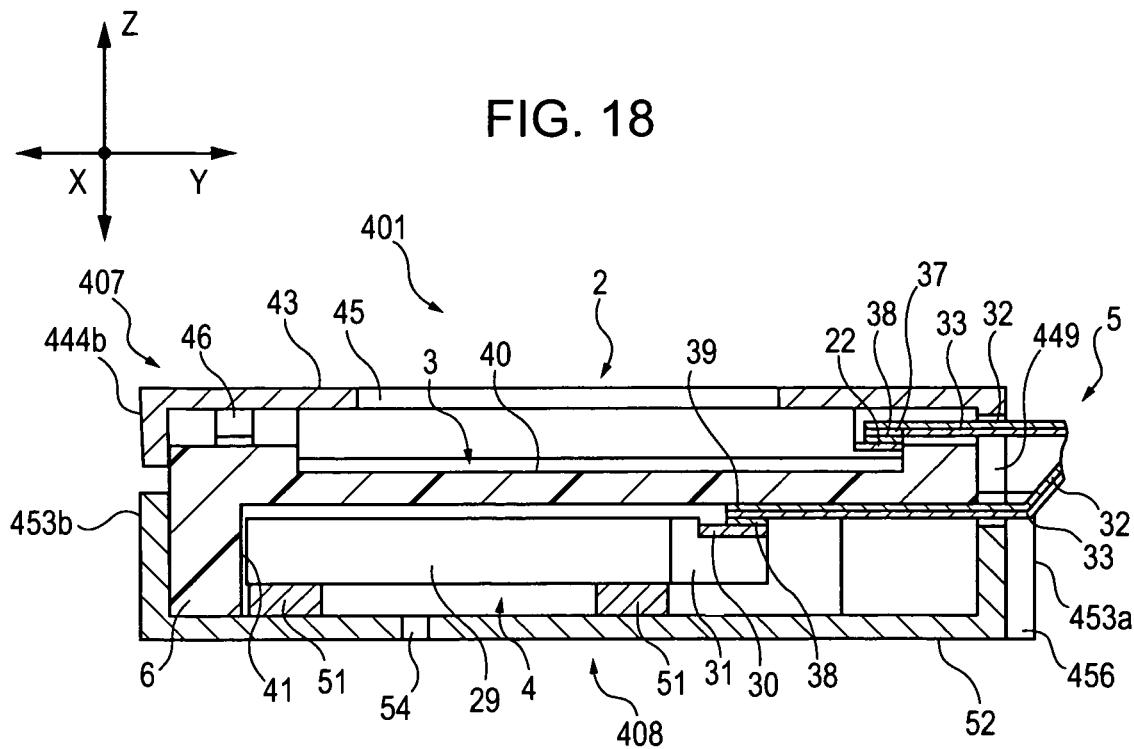

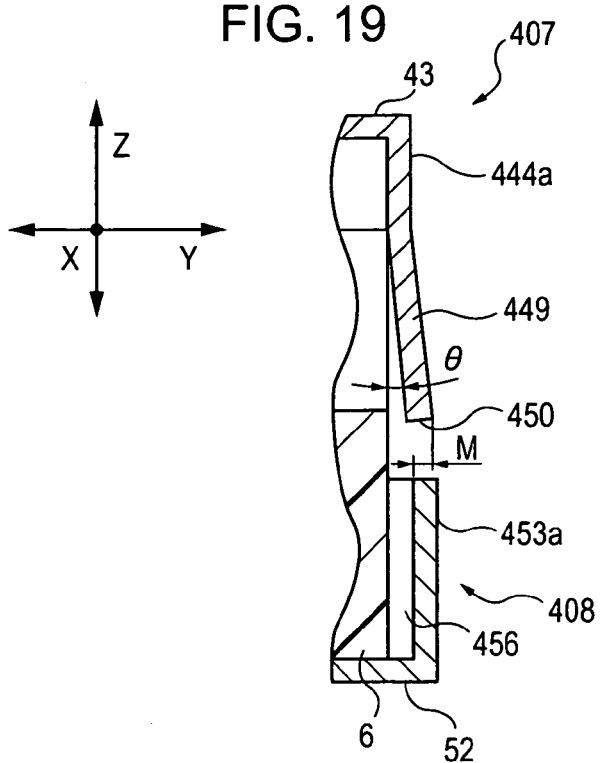
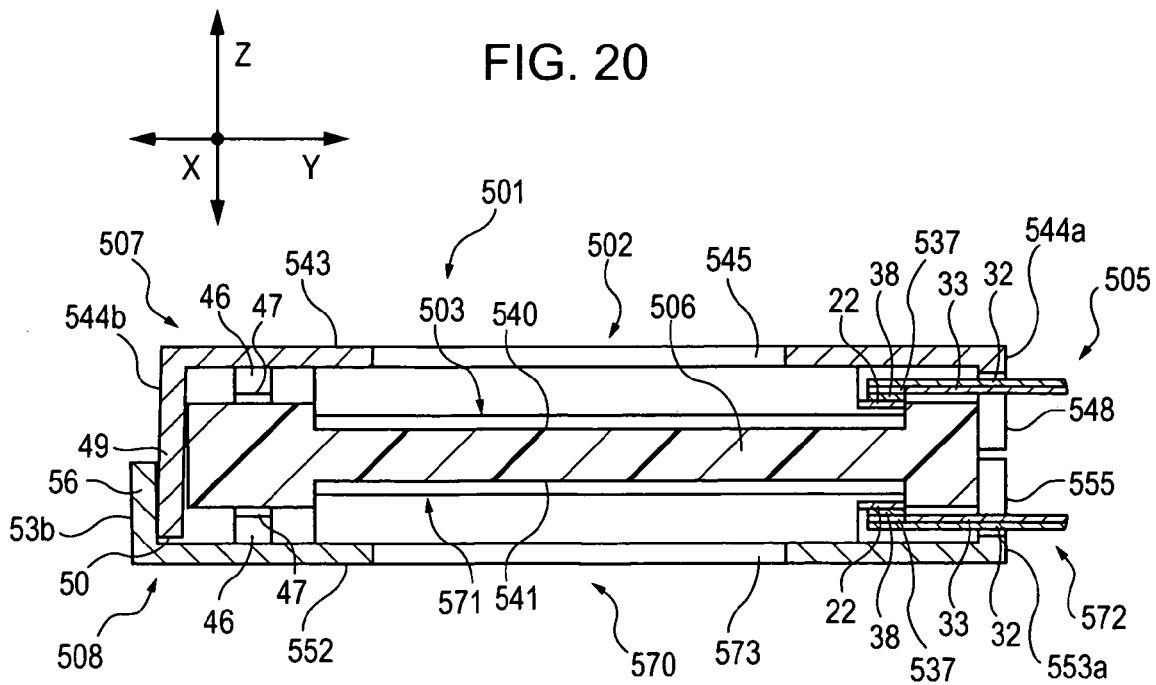

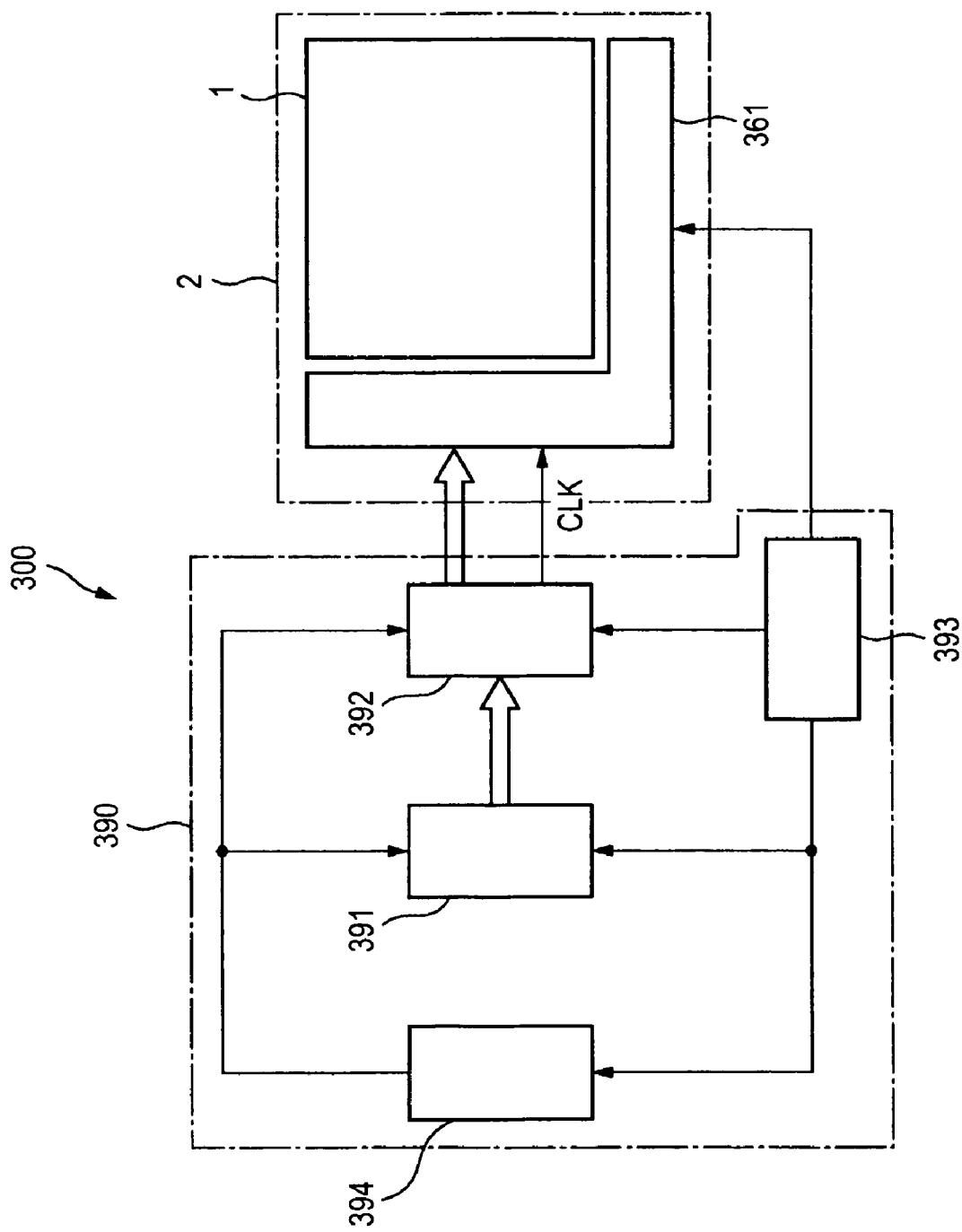

ELECTRO-OPTICAL DEVICE AND ELECTRONIC APPARATUS

BACKGROUND

1. Technical Field

The present invention relates to an electro-optical device that is used in a personal computer, a mobile phone, or the like, and to an electronic apparatus including the electro-optical device.

2. Related Art

Electro-optical devices, such as a liquid crystal display (LCD) device, have been used as display devices for electronic apparatuses, such as personal computers, mobile phones, or the like. However, as high performance personal computers or mobile phones have been recently put on the market, electro-optic devices such as LCD devices with high precision and high performance have been demanded for electronic apparatuses.

For example, in order to prevent malfunction of the operation or circuit of the electro-optical panel that is caused by electrical noise resulting from a potential difference between a plurality of components of the electro-optical device, there has been proposed a method in which, for example, in a front case and a rear case at a conductive layer holder fixing location, exposed surfaces of conductive layers of both of the front and rear cases are brought into contact with each other to make an earth contact (for example, see JP-A-2000-19491 (Paragraphs [0020] to [0027], FIG. 4)).

However, there is a problem in the above-mentioned method in that when the component tolerance variation occurs between the contacted surfaces, rattling occurs between a front case and a rear case, causing both of the cases to be insufficiently electrically connected to each other. When the component tolerance is exactly set to avoid the above-mentioned problem, the cost increases.

For example, in another method of electrically connecting two cases to each other by means of an electrically conductive tape, there is a problem in that the number of components increases as much as the number of pieces of the conductive tape, causing the cost to increase. In another method of electrically connecting two cases to each other by means of a screw, there is a problem in that the number of manufacturing processes increases as much as the number of screw fixing processes, causing the cost to increase.

Further, since it is not easy to eliminate soldering completely, it is difficult to recycle the soldered parts. Therefore, resources are wasted.

SUMMARY

An advantage of some aspects of the invention is that it provides an electro-optical device capable of reliably electrically connecting components to one another at low cost and preventing malfunction and breakdown of an electro-optical panel or electronic components caused by an electrical noise, and an electronic apparatus that uses the electro-optical device.

According to a first aspect of the invention, an electro-optical device is provided which includes a first electro-optical panel, an electronic part that is provided to be adjacent to the first electro-optical panel, a receiving part that is interposed between the first electro-optical panel and the electronic part and receives the first electro-optical panel and the electronic part, a first metal frame that fixes the first electro-optical panel to the receiving part, and a second metal frame that fixes the electronic part together with the first metal frame therebetween. In the electro-optic device, any one of the first and second metal frames is extended toward the other one and has an elastic conductive part, and the conductive part is pressed against the other one by the elastic force and comes into contact with the other one such that the first and second metal frames are electrically connected to each other.

In a case when the "receiving part" has, for example, a rectangular shape, the "receiving part" is not limited to, for example, a frame having four sides, but may include a plate having L-shaped walls at two corners of the plate. In addition, the material of the receiving part is not limited to resin but may metal.

According to the above aspect of the invention, any one of the first and second metal frames is extended toward the other one and has an elastic conductive part, and the conductive part is pressed against the other one by the elastic force and comes into contact with the other one such that the first and second metal frames are electrically connected to each other. Accordingly, even though a component tolerance variation exists, the conductive part is pressed against the other one by the elastic force and comes into contact with the other one, whereby the first and second metal frames are reliably electrically connected to each other. As a result, since it is not required to exactly set the component tolerance, it is possible to reduce the manufacturing cost.

In addition, since the electrical connection is made by the elastic force, it is easy to set the first and second metal frames and it is possible to reduce the manufacturing cost.

According to the first aspect of the invention, the electro-optical device may further include a circuit board that is electrically connected to the first electro-optical panel. Further, the conductive part may be extended from the circuit board side or the opposite side of the circuit board side of the one metal frame toward the other metal frame. Accordingly, for example, when the conductive part is extended from the opposite side of the circuit board side to the other metal frame, there is a margin of space because the circuit board is not connected. Accordingly, it is possible to freely arrange the conductive part or the sidewall of the second metal frame that comes into contact with the conductive part.

In addition, an edge of the conductive part of the one metal frame, which is located on the opposite side of the circuit board side, comes into contact with the other metal frame, and the one metal frame is moved, for example, over the other metal frame in a parallel direction by the elastic force to be adjacent to the other metal frame. Accordingly, since it is possible to make the conductive part reliably come into contact with the other metal frame, it is very easy to manufacture the electro-optical device.

In addition, in contrast, when the conductive part is extended from the circuit board side toward the other metal frame, for example, even though a recess for receiving the conductive part is provided in the other metal frame such that the outer surface of the frame is projected, if it is arranged so as not to interfere with the circuit board, since it doesn't interfere with other components, it is possible to further reducing the size of an electro-optical device.

Further, according to the first aspect of the invention, the conductive part may be a spring. Accordingly, it is possible to easily make the conductive part elastic at low cost, and to make the conductive part come into contact with the other metal frame.

Furthermore, according to the first aspect of the invention, each of the first and second metal frames may have a sidewall that is extended to each other, and the spring may be extended from the sidewall of the one to overlap and come into contact with the sidewall of the other one such that the first and second metal frames are electrically connected to each other. Accordingly, it is possible to reliably electrically connect the first and second metal to each other frames without increasing the planar size seen from the display surface side of the electro-optical device.

Furthermore, according to the first aspect of the invention, the sidewall of the other one may have a recess, which receives at least the spring, on an inner surface or an outer surface of the other sidewall, and the spring may be received in the recess to come into contact with a sidewall of the recess. Accordingly, the spring is received in the recess with which the spring comes into contact, and it is possible to combine an end face of the sidewall of the one except for the spring and an end face of the sidewall of the other one, such that it is possible to further reducing the planar size of the LCD device smaller.

In addition, when it is received in the recess, the spring comes into contact with a larger area of the inner surface of the recess of the sidewall of the other one without being bent, thereby achieving the reliable electrical connection.

Furthermore, according to the first aspect of the invention, a plurality of the springs may be extended from the sidewall of the one. Accordingly, even if the first and second metal frames severely rattle and one of the springs fails to electrically connect the first and second metal frames to each other, the remaining springs can be used to electrically connect them to each other, thereby achieving a reliable electrical connection.

Furthermore, according to the first aspect of the invention, the spring may be a plate spring that rises from the sidewall of the other one. Accordingly, for example, since the spring can be manufactured by using the material of the sidewall of the one metal frame, it is possible to reduce the cost. In addition, since the spring is a plate-shaped spring, even though it is not sufficiently projected from the one sidewall, it can press the other sidewall (the sidewall of the recess), thereby achieving a reliable electrical connection.

Furthermore, according to the first aspect of the invention, the spring may be a portion of the plate spring obtained by extending a part of the sidewall of the one to the other one and by cutting and bending the extended part from the sidewall of the one. Accordingly, since the spring is a plate spring obtained by cutting and bending a part of the sidewall of the one that is extended to the other metal frame, for example, a rectangular extended part of the sidewall of the one, it is physically stronger as compared to a case where the spring is solely projected to the other metal frame. In addition, since the extended part becomes a guide, it is easier to assemble the one metal frame into the other metal frame.

Furthermore, according to the first aspect of the invention, the electronic part may be a soundgenerating unit. Accordingly, it is possible to prevent an electrical noise due to a potential difference between the one metal frame and the other metal frame, which results from the soundgenerating unit, and to receive the soundgenerating unit in the electro-optical device in a compact manner, thereby saving space.

Furthermore, according to the first aspect of the invention, the electronic part may be a second electro-optical panel, and the display side of the second electro-optical panel may face the opposite side of the display side of the first electro-optical panel. Accordingly, even when the electro-optical device has the display surfaces of the electro-optical panels on its two sides, it is possible to reliably electrical connect the first and second metal frames, which fix the electro-optical panels, to each other. Further, it is possible to prevent malfunction of the electro-optical panel, the circuit board, or the like.

According to a second aspect of the invention, an electronic apparatus is provided which includes the above-mentioned electro-optical device.

According to the above aspect of the invention, since there is provided an electro-optical device capable of electrically connecting components to one another at low cost and preventing malfunction and breakdown of an electro-optical panel or electronic components caused by an electrical noise, it is possible to provide a reliable electronic apparatus with high display quality.

BRIEF DESCRIPTION OF THE DRAWINGS

The invention will be described with reference to the accompanying drawings, wherein like numbers reference like elements.

FIG. 17 is a perspective view seen from the opposite direction of FIG. 16.

FIG. 18 is a cross-sectional view taken along the line XVIII-XVIII of FIG. 16 (a soundgenerating unit being not cut away).

FIG. 19 is an explanatory view showing the protruded state of a conductive part according to the modified example 3.

FIG. 20 is a cross-sectional view schematically showing an LCD device according to a second embodiment.

FIG. 21 is a block diagram schematically showing a display control system of an electronic apparatus according to a third embodiment of the invention.

DESCRIPTION OF EXEMPLARY EMBODIMENTS

Figure 1:
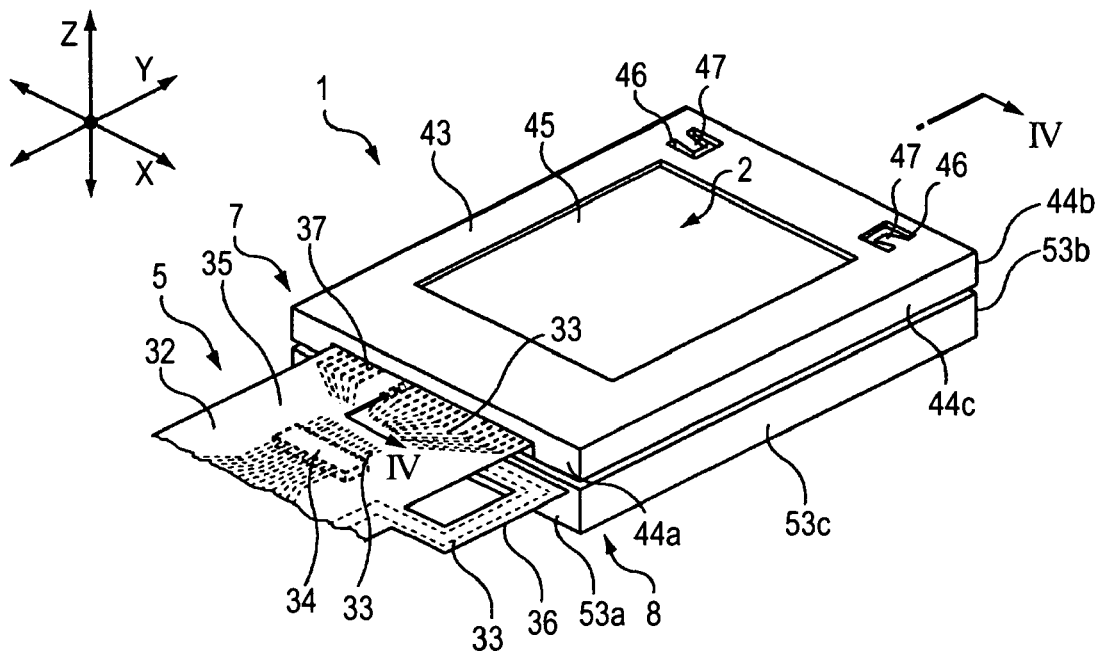
FIG. 1 is a perspective view schematically showing an LCD device according to a first embodiment of the invention.

Embodiments of the invention will now be described with reference to the accompanying drawings. While the embodiments describe a liquid crystal display (LCD) device, e.g., a transflective passive matrix type LCD device, as an example of an electro-optical device, and an electronic apparatus equipped with the LCD device, it should be understood that the invention is not limited thereto. Scales or dimensions of respective components in the respective drawings are made different from each other so that the respective components have sizes capable of being recognized in the drawings.

Figure 2:
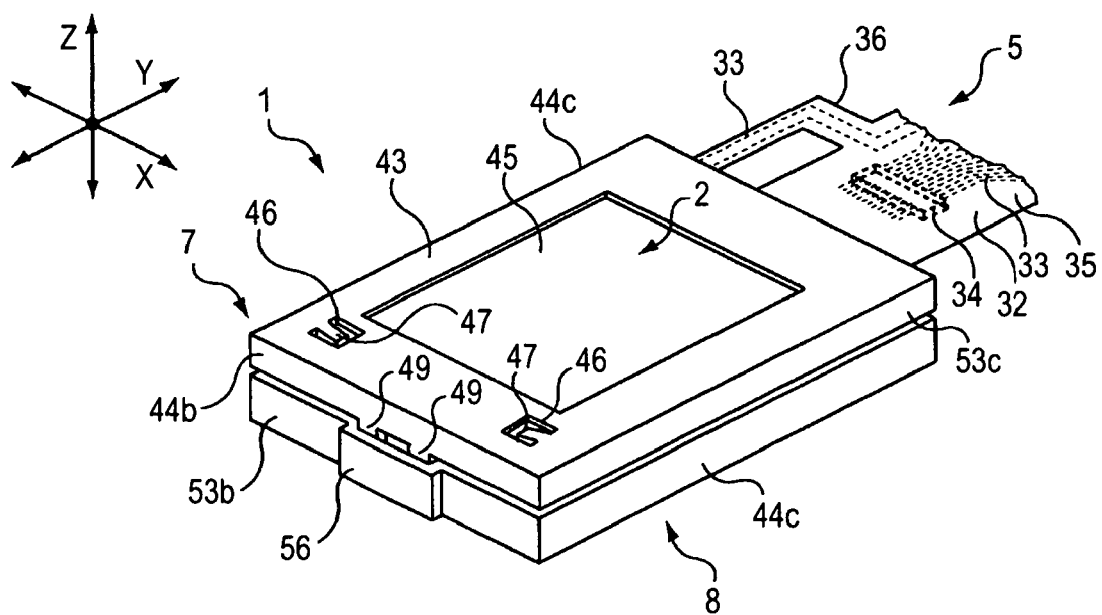
FIG. 2 is a perspective view schematically showing the LCD device that is viewed from the opposite side of FIG. 1.
Figure 3:
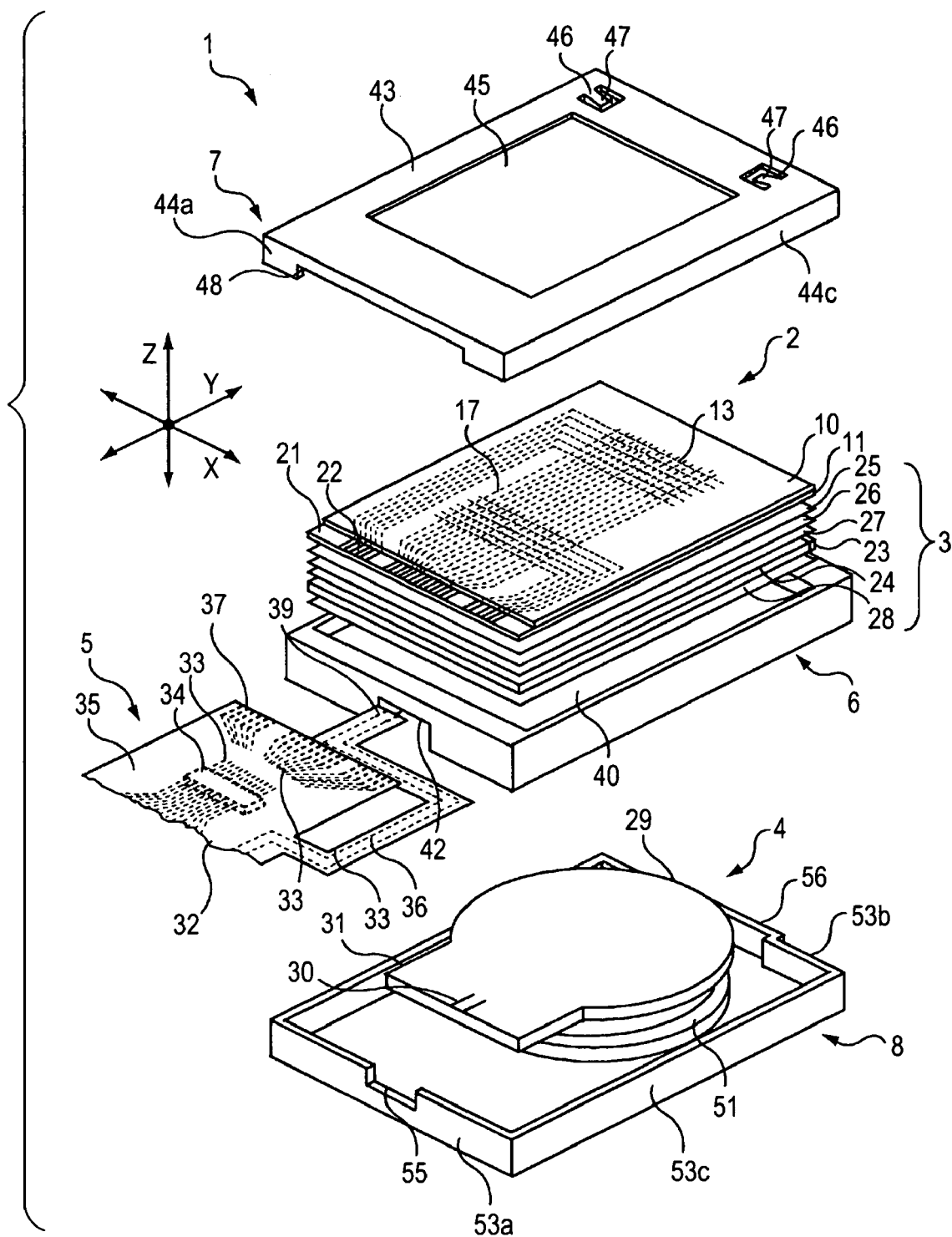
FIG. 3 is an exploded perspective view schematically showing the LCD device according to the first embodiment.
Figure 4:
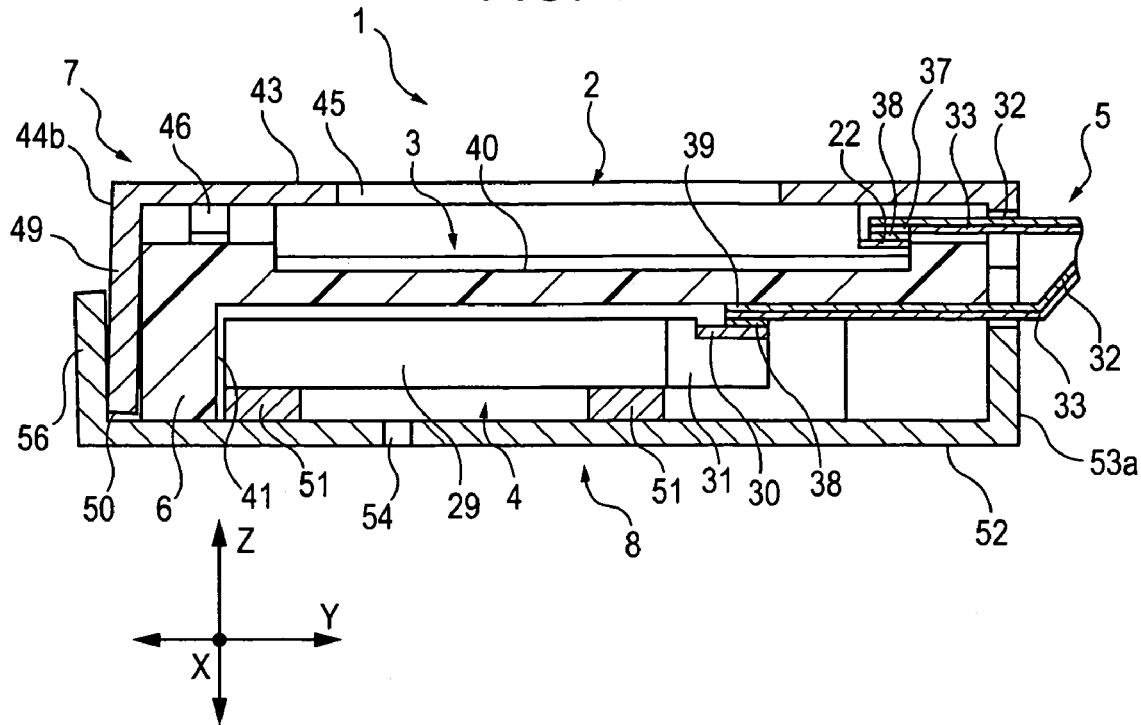
FIG. 4 is a cross-sectional view taken along the line IV-IV of FIG. 1 (a light source and a soundgenerating unit are not cut away).
Figure 5:
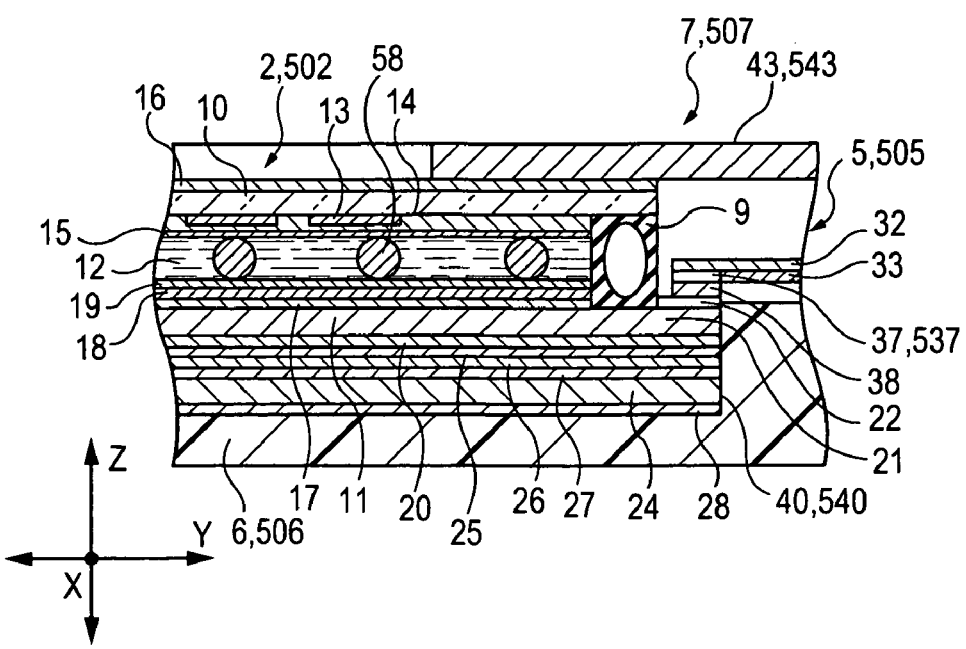
FIG. 5 is a partially enlarged view of FIG. 4.
Figure 6:
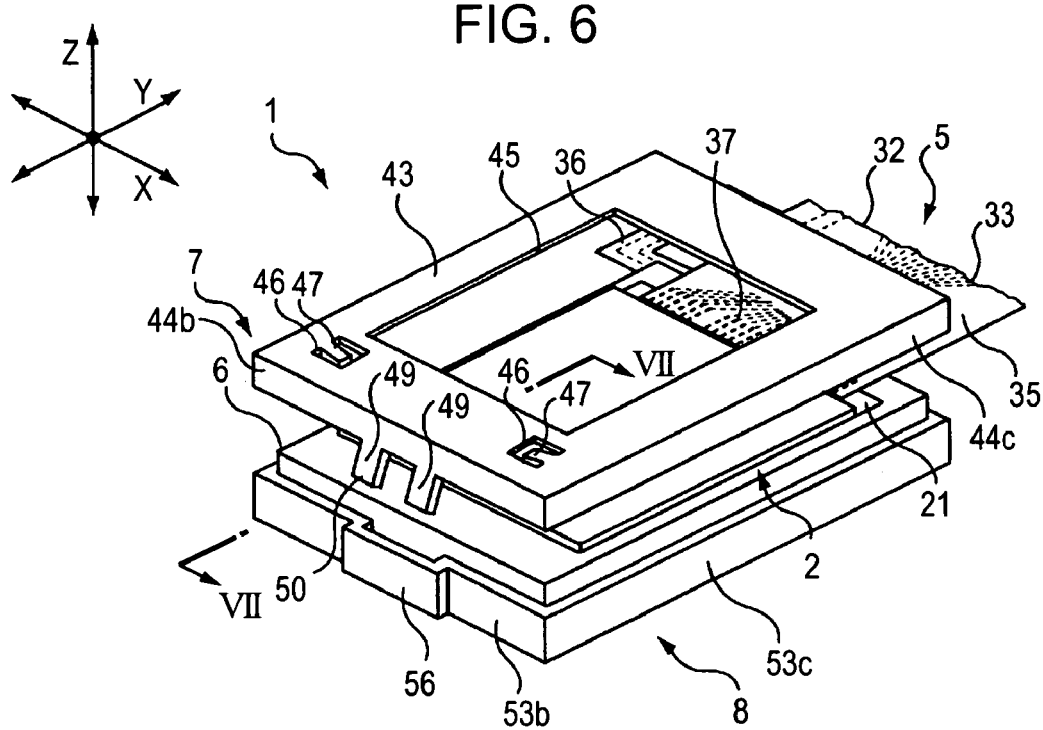
FIG. 6 is a view for schematically explaining a conductive part that is extended from a metal frame according to the first embodiment.
Figure 7:
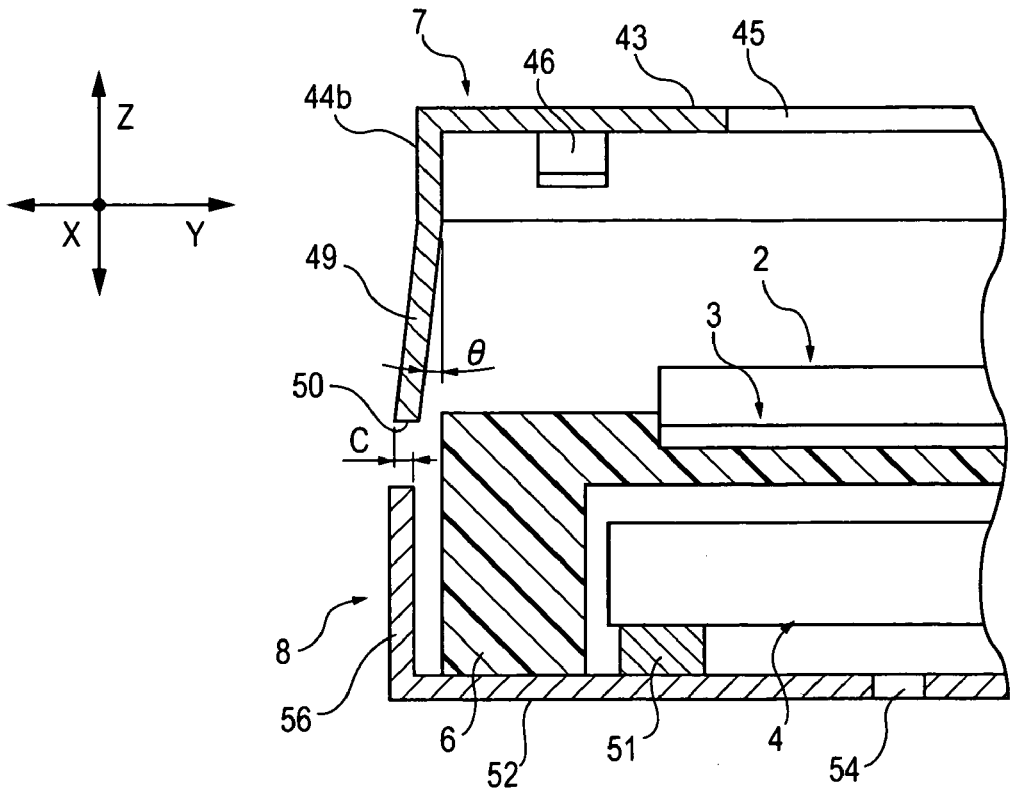
FIG. 7 is a cross-sectional view taken along the line VII-VII of FIG. 6 (the light source and the soundgenerating unit are not cut away).
Figure 8:
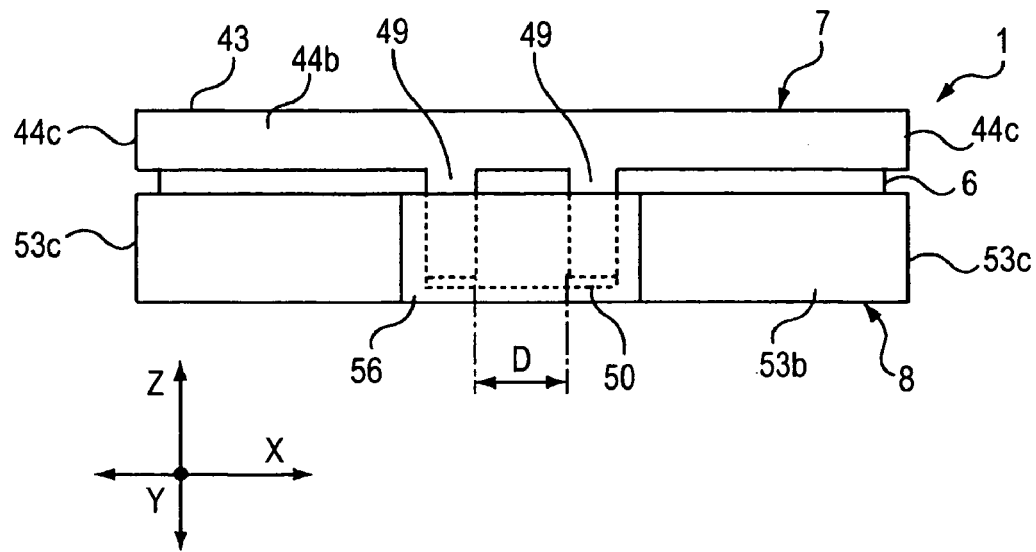
FIG. 8 is a view for schematically explaining the conductive part as seen from the opposite side of a flexible substrate.
Figure 9:
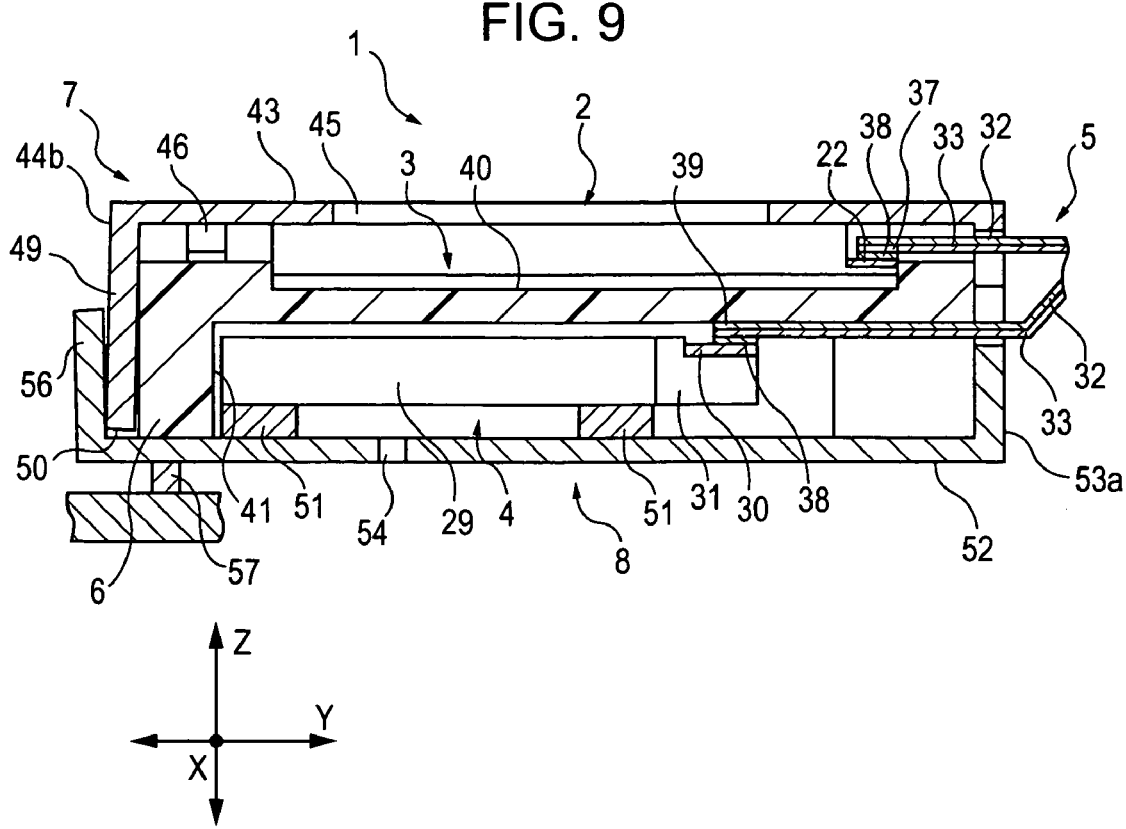
FIG. 9 is a view for schematically explaining earth of the LCD device according to the first embodiment.

FIG. 1 is a perspective view schematically showing an LCD device according to a first embodiment of the invention. FIG. 2 is a perspective view schematically showing the LCD device that is viewed from the opposite side of a flexible substrate. FIG. 3 is an exploded perspective view schematically showing the LCD device. FIG. 4 is a cross-sectional view taken along the line IV-IV of FIG. 1 (a light source and a soundgenerating unit are not cut away). FIG. 5 is a partially enlarged view of FIG. 4. FIG. 6 is an explanatory view schematically showing a conductive part that is extended from a metal frame. FIG. 7 is a partially sectional view taken along the line VII-VII of FIG. 6 (the light source and the soundgenerating unit are not cut away). FIG. 8 is an explanatory view schematically showing the conductive part that is viewed from the opposite side of a flexible substrate. FIG. 9 is an explanatory view for showing the earth of the LCD device.

Configuration of LCD Device

For example, as shown in FIGS. 1 and 3, an LCD device 1 includes a liquid crystal panel 2, which acts as a first electro-optical panel; an illuminating unit 3, which emits light on the liquid crystal panel 2; a soundgenerating unit 4, which is an electronic part provided to be adjacent to the liquid crystal panel 2; a flexible substrate 5, which is a circuit board electrically connected to the liquid crystal panel 2; a plastic frame 6, which receives the liquid crystal panel 2 or the soundgenerating unit 4; and a first metal frame 7 and a second metal frame 8, between which the plastic frame 6 receiving the liquid crystal panel 2 and the soundgenerating unit 4 is interposed. The LCD device 1 further includes additional elements (not shown), if necessary, in addition to the first and second metal frames 7 and 8.

As shown in FIGS. 3 and 5, the liquid crystal panel 2 includes a pair of substrates, i.e., a first substrate 10 and a second substrate 11, which are joined with a sealing material 9, and an electro-optical material, e.g., a STN (Super Twisted Nematic) liquid crystal 12, which is enclosed between the substrates. In addition, a base layer, a reflective layer, a colored layer, a light-shielding layer and the like, which are not shown, are provided on any one of the first and second substrates 10 and 11, if necessary.

As shown in FIGS. 3 and 5, for example, on the first substrate 10, a plurality of common electrodes 13 is formed in a predetermined pattern on the liquid crystal side. In addition, an overcoat layer 14 is formed on the liquid crystal side of the common electrodes 13, and an alignment layer 15 is further formed on the liquid crystal side of the overcoat layer. Further, a polarizer 16 is formed on the outside (the opposite side of the liquid crystal) of the first substrate.

On the other hand, for example, as shown in FIGS. 3 and 5, on the liquid crystal side of the second substrate 11, a plurality of segment electrodes 17 is formed in a predetermined pattern. An overcoat layer 18 is formed on the segment electrode 17. An alignment layer 19 is further formed on the liquid crystal side of the overcoat layer. Also, a polarizer 20 is formed on the outside (the opposite side of the liquid crystal) of the second substrate 11.

The common electrodes 13 are made of a transparent conductive material, for example, ITO (Indium Tin Oxide), in a stripe shape so that they are parallel to one another in one direction (X-axis direction of FIG. 3), as shown in FIGS. 3 and 5.

The plurality of segment electrodes 17 are made of a transparent conductive material, for example, ITO, in a stripe shape, similarly to the common electrodes 13, such that they intersect with the common electrodes 13 in the Y-axis direction of FIG. 3, as shown in FIGS. 3 and 5. Sub-pixels for displaying images are formed at portions at which the common electrodes 13 and the segment electrodes 17 intersect one another.

As shown in FIGS. 3 and 5, the first and second substrates 10 and 11 are plate-shaped members each of which is made of a light-transmissive material, for example, glass or synthetic resin. The second substrate 11 has a protrusion 21 that is projected outward (in the Y-axis direction in FIGS. 3 and 5) with respect to the first substrate 10.

The overcoat layers 14 and 18 are made of, for example, silicon oxide, titanium oxide, or a combination thereof. The alignment layers 15 and 19 are made of, for example, polyimide resin. The polarizers 16 and 20 are composed of, for example, a highly polymerized, polarized thin film, and are attached to the outside of the substrates, respectively.

As shown in FIGS. 3 and 5, for example, on the protrusion 21, a plurality of external terminals 22 is extended from an area, in which the segment electrodes 17 and the common electrodes 13 are surrounded by the sealing material 9, to the protrusion 21, and is electrically connected to each electrode.

As shown in FIGS. 3, 4, and 5, for example, the illuminating unit 3 is a backlight unit that emits light on the second substrate 11. The illuminating unit 3 includes a light source 23, a light guide plate 24, two prism sheets 25 and 26, a diffusing sheet 27, and a reflective sheet 28. The prism sheet 25 adheres to the polarizer 20 of the second substrate 11.

A LED (Light Emitting Diode) is used as an example of the light source 23. As shown in FIG. 3, the light source 23 is provided on the opposite side of a protrusion of the light guide plate 24. It should be understand that the light source 23 may be provided, for example, on the protrusion side.

The light guide plate 24 allows light emitted from the light source 23 to be irradiated, for example, on the entire diffusing sheet 27. The prism sheets 25 and 26 improve luminance of the light emitted from the light guide plate 24.

As shown in FIGS. 3 and 4, for example, the soundgenerating unit 4 is provided below the illuminating unit 3 through the plastic frame 6 to be described below, and includes a main body 29 of a soundgenerating unit, which is composed of a unimorph-type piezoelectric vibrator and the like, and a soundgenerating unit terminal part 31, which has two soundgenerating unit terminals 30 electrically connected to a piezoelectric film (not shown) of the unimorph-type piezoelectric vibrator. With such a configuration, as described below, the liquid crystal panel 2, the illuminating unit 3, and the soundgenerating unit 4 can be reduced to a small size so as to be received in the plastic frame 6. Accordingly, it is possible to form a smaller sized LCD device 1 and to design the device to have an optimum sound quality in advance with regard to the relation between the liquid crystal panel and the soundgenerating unit 4.

As shown in FIGS. 1, 3, and 4, a wiring pattern 33 is formed on a base member 32 of the flexible substrate 5, and a liquid crystal driving IC 34 is mounted on the flexible substrate 5.

The base member 32 is formed of a flexible film-shaped member. The wiring pattern 33 is made of, for example, copper or the like.

In addition, the flexible substrate 5 includes a main body 35, which is connected to the protrusion 21 of the liquid crystal panel 2, and a branch part 36, which is connected to the soundgenerating unit terminal part 31. The liquid crystal driving IC 34 is mounted on the main body 35.

The main body 35 has a plurality of main body connecting terminals 37 at the end portion on the liquid crystal panel side, and is electrically connected to the external terminal 22 of the protrusion 21 of the liquid crystal panel 2 through an external ACF 38 (anisotropic conductive film).

As shown in FIG. 3, for example, the main body connecting terminals 37 are electrically connected to the wiring pattern 33, and are electrically connected to the liquid crystal driving IC 34 through a connecting terminal (not shown), the ACF, or the like on the opposite side of the liquid crystal panel of the wiring pattern 33.

As shown in FIG. 3, for example, when receiving various signals related to display images through an electrically connected wiring pattern, the liquid crystal driving IC 34 generates a driving signal according to the signals. The driving signal is applied to the common electrodes 13 and the segment electrodes 17 through the main body connecting terminal 37, the external ACF 38, the external terminal 22 or the like.

As shown in FIG. 3, for example, the branch part 36 has two branch part connecting terminals 39, and is electrically connected to the soundgenerating unit terminal 30 of the soundgenerating unit terminal part 31 through the external ACF 38. Also, the branch part connecting terminal 39 is electrically connected to the wiring pattern 33 of the branch part 36. With such a configuration, speech current is supplied to the soundgenerating unit terminal 30 through the flexible substrate of the branch part 36, such that it is possible to generate sound by means of the vibration of a piezoelectric vibrator in the main body 29 of the soundgenerating unit.

As shown in FIGS. 3 and 4, for example, the plastic frame 6 has a rectangular shape. The plastic frame 6 has an illuminating unit recess 40 formed on the liquid crystal panel side, a soundgenerating unit recess 41 formed on an opposite side thereof, and a frame guide groove 42 for passing through the branch part 36 of the flexible substrate 5 on a lateral side. The plastic frame 6 is formed to be received between the first and second metal frames 7 and 8 to be described below.

As shown in FIG. 3, for example, the illuminating unit recess 40 is formed such that a bottom surface of the box-shaped illuminating unit recess has almost the same size as that of the illuminating unit 3 which is formed in a planar direction (in the XY-axis direction of FIG. 3). The reflective sheet 28 of the illuminating unit is attached to the bottom surface, for example, with a double-faced adhesive tape or the like. As shown in FIGS. 4 and 6, the illuminating unit recess 40 is formed to be deep enough to receive a part of the liquid crystal panel 2 attached to the prism sheet 25 of the illuminating unit. In addition, a part of the liquid crystal panel 2 attached to the illuminating unit 3, together with the illuminating unit 3, is received in the illuminating unit recess 40.

The soundgenerating unit recess 41 has a hollow for receiving the soundgenerating unit 4 or the like. The soundgenerating unit 4 is received in the soundgenerating unit recess 41 such that the soundgenerating unit terminal part 31 faces the frame guide groove 42 in the Y-axis direction, as shown in FIGS. 3 and 4.

As shown in FIGS. 3 and 4, the frame guide groove 42 is formed so that the branch part connecting terminal of the branch part 36 of the flexible substrate 5 can be inserted into the lateral surface disposed on the flexible substrate side of the plastic frame 6. The branch part 36 of the flexible substrate 5 having the branch part connecting terminal 39 electrically connected to the soundgenerating unit terminal 30 through the external ACF 38 is inserted into the frame guide groove 42.

As shown in FIGS. 1, 3, and 4, for example, the first metal frame 7 covers and presses the liquid crystal panel 2 received in each of the plastic frames 6 from the upper side of the drawings such that the liquid crystal panel 2 is fixed. The first metal frame 7 has a rectangular planar portion 43 as a display surface, and a sidewall 44 that is formed to be orthogonal to the four sides of the planar portion 43 toward the second metal frame 8 to be described.

As shown in FIG. 3, for example, an opening 45 and two push spring parts 46 are provided on the planar portion 43. The opening 45 provided in the middle of the planar portion 43 acts as a liquid crystal display surface. The two push spring parts 46 are provided between the opening 45 and edges of one side on the opposite side of the flexible substrate of the planar portion 43.

The push spring part 46 has a U-shaped hole that is formed, for example, by punching. In addition, there is provided a push spring 47 formed by elastically protruding a tongue-shaped portion that is part of the first metal frame 7 formed at the hole. The two push spring parts 46 are formed such that the push springs 47 face each other in the vicinity of corners of the planar portion 43.

As shown in FIGS. 1, 2, and 3, for example, the sidewall 44 has a sidewall 44a formed on the flexible substrate side, a sidewall 44b formed on the opposite side of the sidewall 44a, and two sidewalls 44c which are formed between the sidewalls 44a, 44b and face each other.

As shown in FIG. 3, for example, the sidewall 44a has a first metal frame recess 48 in its central portion so that a main body connecting terminal of the main body 35 of the flexible substrate 5 can be inserted. Accordingly, the main body 35 of the flexible substrate 5 is inserted from the outside of the first metal frame 7, such that the main body connecting terminal 37 is electrically connected to the external terminal 22 through the external ACF 38.

As shown in FIGS. 6 and 7, for example, the sidewall 44b has two separated conductive parts 49 each of which is extended from its central portion toward the second metal frame 8 and is an elastic plate spring.

As shown in FIG. 7, the conductive part 49 is formed to be outwardly inclined by θ degree starting from the origin, at which the conductive part 49 is extended, toward the second metal frame 8 of the sidewall 44b. The outer surface of an edge 50 of the conductive part 49 is projected from an inner sidewall of a recess of the second metal frame 8 by the gap C indicated in FIG. 7.

With such a configuration, when the conductive part 49 is inserted into the recess of the second metal frame 8 as described below, the conductive part 49 is pressed back to a direction opposite to the projected direction by the gap C. Accordingly, the stress due to the elastic force reacting against the push back always presses the conductive part 49 to the inner sidewall of the recess of the second metal frame 8 such that the conductive part 49 reliably comes into contact with the inner sidewall of the recess of the second metal frame 8.

For example, even when a component tolerance variation exists, at least the edge 50 of the conductive part 49 can come into contact with the second metal frame 8 within the projected portion of the conductive part 49, for example, within the range of C of FIG. 7. Accordingly, the first metal frame 7 can reliably come into contact with the second metal frame 8.

As shown in FIGS. 4 and 8, for example, when the first and second metal frames 7 and 8 are set in the plastic frame 6, the length of the conductive part 49 is formed such that the edge 50 of the conductive part 49 is located a little higher than the inner bottom surface of the second metal frame 8. Accordingly, even when a component tolerance variation exists, it is possible to prevent the edge 50 from coming into contact with the inner bottom surface of the second metal frame 8, such that the first metal frame 7 is not raised from the plastic frame 6. In contrast, even when the conductive part 49 is too short, it is possible to prevent the conductive part 49 from deviating from the recess of the second metal frame 8 due to the component tolerance variation or vibration.

As shown in FIG. 8, for example, the two conductive parts 49 are separated from each other by the gap D of the drawing. Accordingly, even when any one of the two conductive parts 49 does not come into contact with the second metal frame 8 due to vibrating or the like, the first and second metal frames 7 and 8 can be electrically connected to each other by means of the remaining one of the conductive parts 49. In addition, since the two conductive parts 49 are separated from each other by the gap D of FIG. 8, it is possible to reliably electrically connect the first and second metal frames 7 and 8 to each other even though the sidewall is partly distorted.

In addition, while the above-mentioned embodiment describes that two conductive parts 49 are provided, the invention is not limited thereto, but, for example, one or at least three conductive parts may be provided.

As shown in FIGS. 2, 3 and 4, for example, the second metal frame 8 covers the soundgenerating unit 4 and a supporting body 51 for supporting the soundgenerating unit 4, which are received in each plastic frame 6, from the bottom side of the drawings, such that the soundgenerating unit 4 and the supporting body 51 are fixed. The second metal frame 8 has a rectangular planar portion 52, and a sidewall 53 that is formed to be orthogonal to the four sides of the planar portion 52 toward the first metal frame 7.

As shown in FIG. 4, in the planar portion 52, a soundproofing hole 54 for discharging sound generated by the soundgenerating unit 4 is formed in an area surrounded by a portion at which the planar portion 52 comes into contact with the supporting body 51 of the soundgenerating unit 4. The supporting body 51 is provided inside the planar portion 52 of the second metal frame 8. As shown in FIG. 4, for example, the supporting body 51 is formed in a ring shape having a diameter as much as it is not projected from the external circumference of the main body 29 of the soundgenerating unit. While only a single soundproofing hole 54 is shown in the drawing, a plurality of soundproofing holes may be provided.

As shown in FIG. 3, for example, the sidewall 53 has a sidewall 53a formed on the flexible substrate side, a sidewall 53b formed on the opposite side of the sidewall 53a, and two sidewalls 53c which are formed between the sidewalls 53a and 53b and face each other.

As shown in FIG. 3, for example, the sidewall 53a has a second metal frame recess 55 in its central portion so that a branch part connecting terminal of the branch part 36 of the flexible substrate 5 can be inserted. Accordingly, the branch part 36 of the flexible substrate 5 is inserted from the outside of the second metal frame 8, such that the branch part connecting terminal 39 is electrically connected to the soundgenerating unit terminal 30 through the external ACF 38.

As shown in FIGS. 6 and 7, for example, the sidewall 53b has a sidewall recess 56 for receiving the conductive part 49 in the central portion.

As shown in FIG. 6, for example, the sidewall recess 56 is indented in a box shape from the inside of the sidewall 53b toward the outside. The sidewall recess 56 is formed to be a little larger than the thickness of the conductive part 49 extended from the first metal frame 7, as shown in FIG. 7. Accordingly, it is possible to easily insert the conductive part 49 into the sidewall recess 56, and to cope with some component tolerance variation.

As shown in FIG. 8, for example, the sidewall recess 56 is formed such that its inner length in the X-axis direction of the drawing is approximately equal to a total of the widths of two conductive parts 49 and the gap D (of FIG. 8) between them when seen from the sidewall 53b. Therefore, it is possible to make the protrusion from the second metal frame 8 as small as possible, thereby reducing the size of the LCD device 1.

As shown in FIG. 9, for example, the LCD device 1 is configured such that the second metal frame 8 is electrically connected to a middle frame of an electronic apparatus, such as a mobile phone, by means of a connecting part 57. Accordingly, the first and second metal frames 7 and 8, which have the same potential by the conductive part 49, are put to earth.

The first and second metal frames 7 and 8 are made of metal, such as steel. Their basis metal is exposed at, at least, a surface of the conductive part 49 of the first metal frame 7 and an inner surface of the sidewall recess 56 of the second metal frame 8. Accordingly, it is possible to reliably electrically connect the first and second metal frames 7 and 8 to each other.

Method of Manufacturing LCD Device

A method of manufacturing an LCD device having the above-mentioned configuration will now be described. In this case, a method of assembling the plastic frame 6 and the first and second metal frames 7 and 8 will be mainly described.

FIG. 10 is an explanatory view for showing the assembly of the first metal frame 7.

First, the liquid crystal panel 2 is manufactured.

ITO, which is the material for forming the common electrodes 13, is deposited on the first substrate 10 by the sputtering method and then patterned by the photolithographic method, such that the common electrodes 13 are formed in a stripe shape in the X-axis direction as shown in FIGS. 3 and 4. In addition, the overcoat layer 14 and the alignment layer 15 are sequentially formed thereon and are then subjected to a rubbing process, thereby forming the first substrate side.

As shown in FIGS. 3 and 4, the segment electrodes 17 are formed on the second substrate 11 in a stripe shape in the Y-axis direction. The overcoat layer 18 and the alignment layer 19 are further formed thereon, thereby forming the second substrate side. In addition, when the segment electrodes 17 are formed, the external terminal 22 of the protrusion 21 or the like may be formed at the same time.

Gap members 58 are scattered on the first substrate 10 by a dry scattering method, and the first and second substrates 10 and 11 are joined with the sealing material. Next, the liquid crystal 12 is injected through an injection hole (not shown) of the sealing material 9. The injection hole of the sealing material 9 is sealed with a sealing material, such as an ultraviolet curing resin or the like.

Next, the flexible substrate is manufactured.

A predetermined wiring pattern 33, the main body connecting terminal 37, the branch part connecting terminal, and other connecting terminals are formed on the base member 32 formed by the mold of the main body 35 and the branch part 36. Next, the liquid crystal driving IC 34 is mounted on a connecting terminal of the main body 35 through ACF.

Other ICs or capacitors are mounted, and the main body connecting terminal 37 of the flexible substrate 5 is electrically connected to the external terminal 22 of the liquid crystal panel 2 through the external ACF 38. Similarly, the branch part connecting terminal 39 is electrically connected to the soundgenerating unit terminal 30 of the soundgenerating unit 4 through the external ACF 38.

Subsequently, the supporting body 51 is set on the inner side of the planar portion 52 of the second metal frame 8 such that the soundproofing hole 54 of the second metal frame 8 is located at the central portion of the inner side of the supporting body 51. The main body 29 of the soundgenerating unit is provided thereon. The main body 29 of the soundgenerating unit, the soundgenerating unit terminal part 31, and the electrically connected branch part 36 are received in the soundgenerating unit recess 41 of the plastic frame 6 so as to retained therein, and the plastic frame 6 is set in the second metal frame 8. When the soundgenerating unit 4 is set in the plastic frame 6 and the second metal frame 8, the branch parts 36 of the flexible substrate 5 are inserted into the frame guide groove 42 and the second metal frame recess 55, respectively.

As shown in FIGS. 3 and 4, for example, the reflective sheet 28, the light guide plate 24 to which the light source 23 is attached, the diffusing sheet 27, and the prism sheets 26 and 25 are sequentially mounted on a bottom surface of the illuminating unit recess 40 of the plastic frame 6. The liquid crystal panel 2 to which the main body 35 of the flexible substrate 5 is connected is provided thereon.

As shown in FIGS. 4 and 6, for example, the first metal frame 7 is set to cover the liquid crystal panel 2 and the plastic frame 6 that receives the liquid crystal panel 2.

Figure 10A:
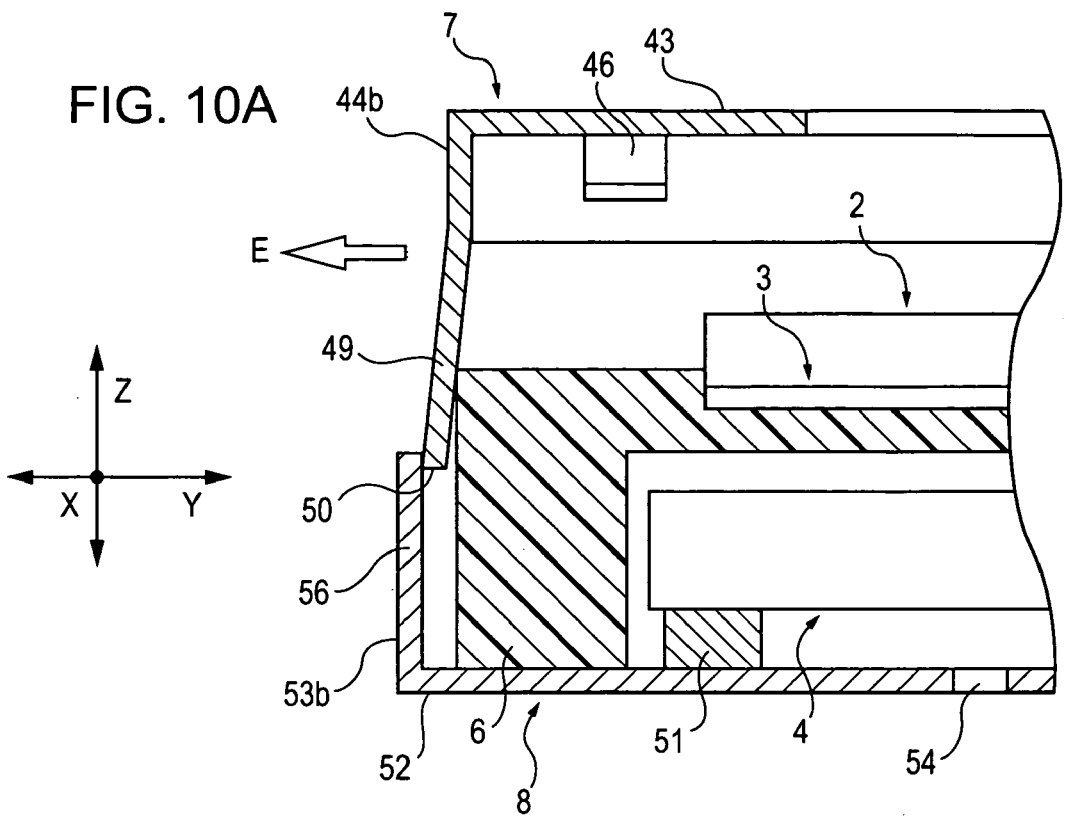
FIGS. 10A and 10B are views for explaining the assembly of a first metal frame according to the first embodiment.

At this time, as shown in FIG. 10A, the edge 50 of the conductive part 49 that is extended to be inclined outward is inserted into the gap between the sidewall recess 56 of the second metal frame 8 and the plastic frame 6. In this state, the first metal frame 7 is moved to a direction of the arrow E of the drawing such that the angle θ between the conductive part 49 and the sidewall 44b is approximately equal to zero.

Figure 10B:
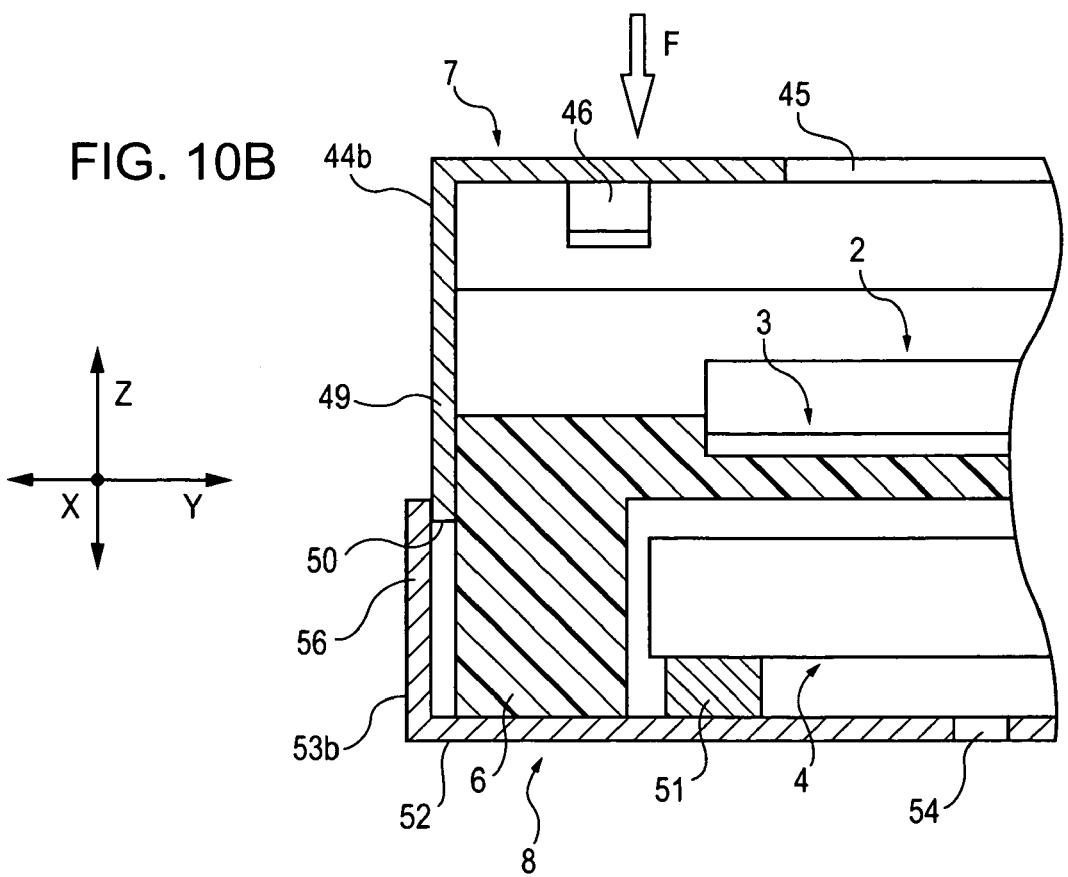

As a result, as shown in FIG. 10B, since, in the second metal frame 8, the inner surface of the sidewall 44b and the outer surface of the plastic frame 6 match each other in the Z-axis direction of the drawing, the first metal frame 7 is moved to a direction of the arrow F of the drawing such that the conductive part 49 is inserted into the gap between the sidewall recess 56 of the second metal frame 8 and the plastic frame 6. Accordingly, for example, as shown in FIG. 9, the first metal frame 7 is set to cover the liquid crystal panel 2 and the plastic frame 6 that receives the liquid crystal panel 2, and the conductive part 49 reliably comes into contact with the inner wall of the sidewall recess 56 of the second metal frame 8, thereby electrically connecting the first and second metal frames 7 and 8 to each other.

As shown in FIG. 10B, when the first metal frame 7 is moved to the second metal frame 8 (in the direction of the arrow F of the drawing), the circumference of the opening 45 of the first metal frame 7 presses the non-displaying area of the first substrate 10 from the upper side as shown in FIG. 9, and the liquid crystal panel 2 is fixed to the illuminating unit recess 40 of the plastic frame 6 in each illuminating unit 3.

Similarly, as shown in FIG. 10B, when the first metal frame 7 is moved to the second metal frame 8 (to the direction of the arrow F of the drawing), the push springs 47 of two push spring parts 46 provided in the first metal frame 7 come into contact with the plastic frame 6 as shown in FIG. 9, and it is possible to prevent rattling between the plastic frame 6 and the first metal frame 7 by the elastic force of the spring.

As described above, the first and second metal frames 7 and 8 are set in the plastic frame 6 and other required components are fixed, thereby completing the LCD device 1.

As shown in FIG. 9, for example, the LCD device 1 is configured such that the second metal frame 8 is electrically connected to a middle frame of an electronic apparatus, such as a mobile phone, by means of a connecting part 57. Accordingly, the first and second metal frames 7 and 8, which have the same potential by the conductive part 49, are put to earth.

According to the present embodiment, the first metal frame 7 has the elastic conductive part 49 that is extended toward the second metal frame 8, and the conductive part 49 is pressed to the inner wall of the sidewall recess 56 of the second metal frame 8 by the elastic force and comes into contact with the inner wall such that the first and second metal frames 7 and 8 are electrically connected to each other. Accordingly, even when a component tolerance variation exists, the conductive part 49 of the first metal frame 7 is pressed to, for example, the second metal frame by the elastic force, such that the first and second metal frames are reliably electrically connected to each other. As a result, since it is not required to exactly set the component tolerance, it is possible to reduce the manufacturing cost.

In addition, the first and second metal frames 7 and 8 have the sidewalls 44, 53 which are extended to each other, and the conductive part 49, a spring, is extended from the sidewall 44b of the first metal frame 7 and overlaps the sidewall 53b of the second metal frame 8 so as to come into contact with the sidewall 53. In this way, the first and second metal frames 7 and 8 are electrically connected to each other. Accordingly, it is possible to reliably electrically connect the first and second metal frames 7 and 8 to each other without increasing the planar size seen from the display surface side of the LCD device 1 as an electro-optical device.

In addition, the other sidewall 53b has the sidewall recess 56, which can receive the conductive part 49, in an inner side of the sidewall 53b, and the conductive part 49 is received in the sidewall recess 56 and comes into contact with an inner wall of the sidewall recess 56. Accordingly, the conductive part 49, a spring, is received in the sidewall recess 56 with which the conductive part 49 comes into contact, and it is possible to combine an end face of the sidewall 44a except for the conductive part 49 and an end face of the sidewall 53b except for the sidewall recess 56, such that it is possible to make the planar size of the LCD device 1 smaller.

In addition, since the sidewall recess 56 is provided, the conductive part does not get bent and comes into contact with a more area of the inner wall of the sidewall recess 56 of the sidewall 53b, such that a reliable electrical connection is secured.

In addition, since, for example, two conductive parts 49 are extended from the sidewall 44b, even though the first and second metal frames 7 and 8 severely rattle and one of the conductive parts 49 fails to electrically connect the first and second metal frames 7 and 8 to each other, the remaining conductive part 49 can be used to electrically connect them to each other, such that a reliable electrical connection is secured.

In addition, since the soundgenerating unit 4, an electronic part, is fixed to, for example, the second metal frame 8, it is possible to reliably prevent an electrical noise due to a potential difference between the second metal frame 8 and the first metal frame 7, which results from the soundgenerating unit 4, and to receive the soundgenerating unit 4 in the LCD device 1 more in a compact manner, thereby saving space.

In addition, since the conductive part 49 is extended from the sidewall 44b, which is located at the opposite side of the flexible substrate, toward the sidewall 53b of the second metal frame 8, for example, the flexible substrate 5 is not connected, there is a margin of space. Accordingly, it is possible to freely arrange the conductive part 49 or the sidewall recess 56 of the second metal frame 8 that comes into contact with the conductive part 49.

In addition, after the edge 50 of the conductive part 49 comes into contact with the inner wall of the sidewall recess 56, the first metal frame is moved in parallel directly above the second metal frame by the elastic force, and the first metal frame is set to be adjacent to the second metal frame. Accordingly, since it is possible to reliably bring the conductive part 49 into contact with the second metal frame 8, it is easy to manufacture the LCD device 1.

MODIFIED EXAMPLE 1

An LCD device according to modified example 1 of the first embodiment of the invention will now be described. The modified example 1 is different from the first embodiment in that a sidewall recess of the second metal frame is formed outside the sidewall of the second metal frame. In the modified example 1, the same components as those in first embodiment are denoted by the same reference numerals and a detailed description thereof will be omitted.

Figure 11:
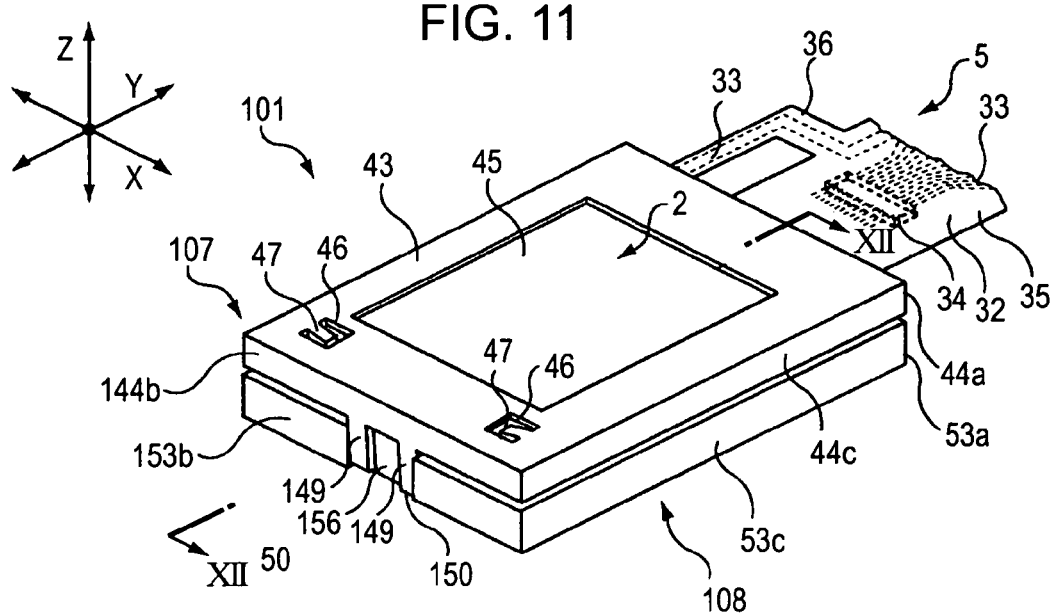
FIG. 11 is a perspective view schematically showing an LCD device according to modified example 1.
Figure 12:
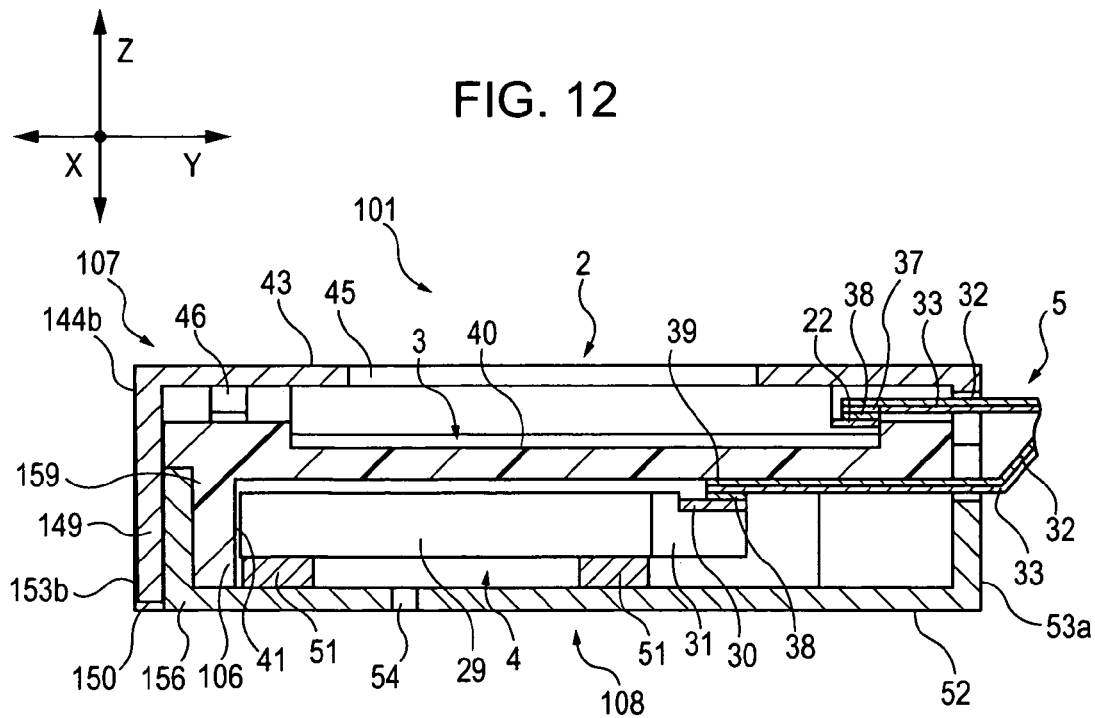
FIG. 12 is a cross-sectional view taken along the line XII-XII of FIG. 11.
Figure 13:
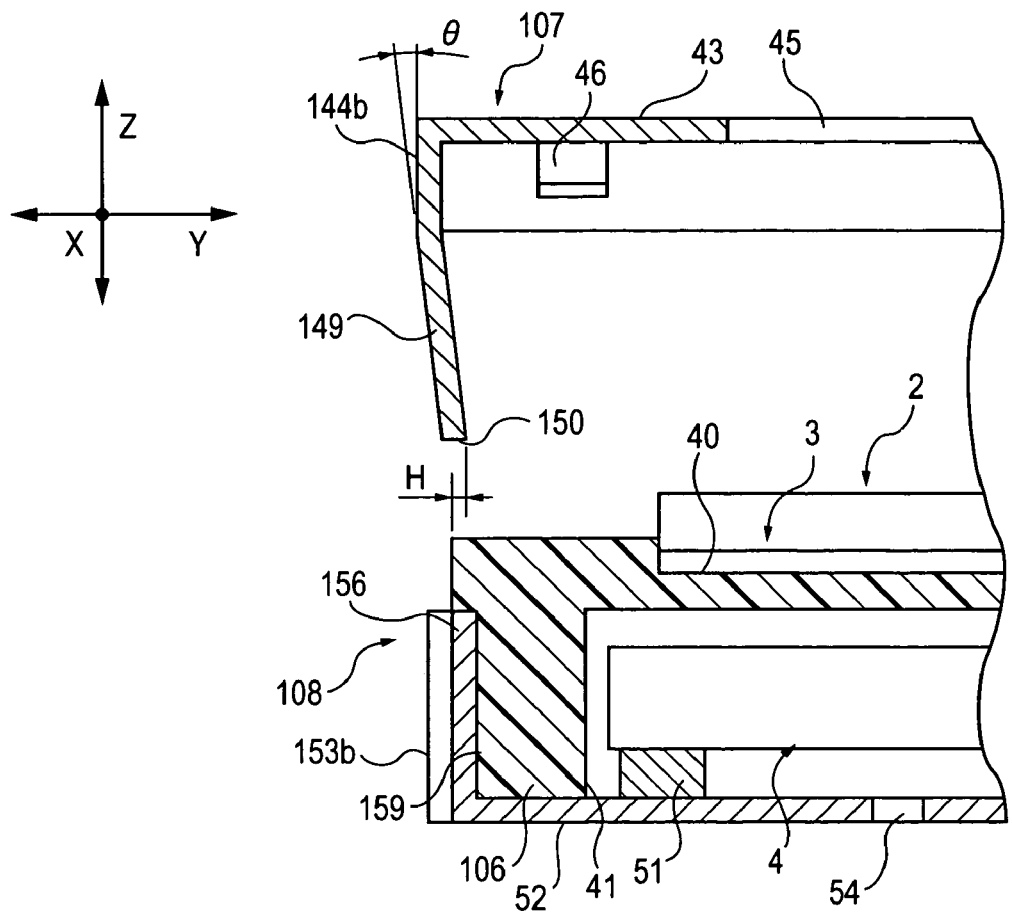
FIG. 13 is an enlarged explanatory view of a conductive part according to the modified example 1.

FIG. 11 is a perspective view schematically showing an LCD device according to the modified example 1. FIG. 12 is a cross-sectional view taken along the line XII-XII of FIG. 11. FIG. 13 is an enlarged view for explaining a conductive part.

Configuration of LCD Device

As shown in FIGS. 11 and 12, for example, the LCD device 101 includes a liquid crystal panel 2 that is a first electro-optical panel, an illuminating unit 3 that emits light on the liquid crystal panel 2, a soundgenerating unit 4 that is provided as an electronic part to be adjacent to the liquid crystal panel 2, a flexible substrate 5 that is a circuit board electrically connected to the liquid crystal panel 2, a plastic frame 106 that receives the liquid crystal panel 2 or the soundgenerating unit 4, and first and second metal frames 107 and 108 between which the plastic frame 106 receiving the liquid crystal panel 2, the soundgenerating unit 4, and the like is interposed.

The plastic frame 106 has, for example, a rectangular shape, and includes an illuminating unit recess 40 formed on the liquid crystal panel side, a soundgenerating unit recess 41 formed on an opposite side thereof, and a frame guide groove 42 formed in the side surface on the flexible substrate side so as to pass through the branch part 36 of the flexible substrate 5. The plastic frame 106 is formed to be interposed between the first and second metal frames 107 and 108.

As shown in FIG. 12, for example, the plastic frame 106 has a frame recess 159 that is formed to be indented at the middle of a sidewall on the flexible substrate side and the opposite side. The frame recess 159 is formed so that the second metal frame 108 can receive the portion that protrudes in a box shape on the side of the plastic frame 106.

As shown in FIGS. 11 and 12, for example, the first metal frame 107 covers and presses the liquid crystal panel 2 received in the plastic frame 106 from the upper side of the drawing such that the liquid crystal panel is fixed. The first metal frame 107 has a planar portion 43 that has a rectangular shape and serves as the display surface, and a sidewall 144 that is formed to be orthogonal to four sides of the planar portion 43 toward the second metal frame 108 to be described below.

The sidewall 144 has, for example, a sidewall 44a formed on the flexible substrate side, a sidewall 144b formed to face the sidewall 44a, and two sidewalls 44c that face each other and are interposed between the sidewalls 44a, 144b.

As shown in FIGS. 11 and 12, for example, the sidewall 144b has two separated conductive parts 149 each of which is extended from its central portion toward the second metal frame 108 and is an elastic plate spring.

As shown in FIG. 13, the conductive part 149 is formed to be inwardly inclined by θ degree starting from the origin, at which the conductive part 149 is extended, toward the second metal frame 108 of the sidewall 144b. The inner surface of an edge 150 of the conductive part 149 is inwardly projected from an outer sidewall of a recess of the second metal frame 108 to be described below by the gap H indicated in FIG. 13.

With such a configuration, when the conductive part 149 is inserted into the recess of the second metal frame 108 as described below, the conductive part 149 is pressed back to a direction opposite to the projected direction by the projected portion, for example, the gap H. Accordingly, the stress due to the elastic force reacting against the push back always presses the conductive part 149 to the inner sidewall of the recess of the second metal frame 108 such that the conductive part 149 reliably comes into contact with the inner sidewall of the recess of the second metal frame 108.

For example, even when a component tolerance variation exists, at least the edge 150 of the conductive part 149 can come into contact with the second metal frame 108 within the projected portion of the conductive part 149, for example, within the range of H of FIG. 13. Accordingly, the first metal frame 107 can be reliably electrically connected with the second metal frame 108.

As shown in FIG. 12, for example, when the first and second metal frames 107 and 108 are set in the plastic frame 106, the length of the conductive part 149 is formed such that the edge 150 of the conductive part 149 is located a little higher than the outer bottom surface of the second metal frame 108. Accordingly, even when a component tolerance variation exists, it is possible to prevent the edge 150 from deviating from the outer wall surface of the second metal frame 108. In contrast, even when the conductive part 149 is too short, it is possible to prevent the conductive part 149 from deviating from the outer wall of the second metal frame 108 due to the component tolerance variation or vibration.

As shown in FIG. 11, for example, the two conductive parts 149 are separated from each other. Accordingly, even when any one of the two conductive parts 149 does not come into contact with the second metal frame 108 due to vibrating or the like, the first and second metal frames 107 and 108 can be electrically connected with each other by means of the remaining one of the conductive parts 149. In addition, since the two conductive parts 149 are separated from each other, it is possible to reliably electrically connect the first and second metal frames 107 and 108 to each other even though the sidewall is partly distorted.

In addition, while the above-mentioned embodiment describes that two conductive parts 149 are provided, the invention is not limited thereto, but, for example, one or at least three conductive parts may be provided.

As shown in FIGS. 11 and 12, for example, the second metal frame 108 covers the soundgenerating unit 4 and a supporting body 51 for supporting the soundgenerating unit 4, which are received in each plastic frame 106, from the bottom side of the drawings such that the soundgenerating unit 4 and the supporting body 51 are fixed. The second metal frame 108 has a rectangular planar portion 52, and a sidewall 153 that is formed to be orthogonal to the four sides of the planar portion 52 toward the first metal frame 107.

As shown in FIG. 11, for example, the sidewall 153 has a sidewall 53a formed on the flexible substrate side, a sidewall 153b formed on the opposite side of the sidewall 53a, and two sidewalls 53c which are formed between the sidewalls 53a, 153b and face each other.

As shown in FIGS. 11 and 12, for example, the sidewall 153b has a sidewall recess 156 for receiving the conductive part 149 in the central portion.

For example, the sidewall recess 156 is indented in a box shape from the outside of the sidewall 153b toward the inside. The sidewall recess 156 is formed to be a little larger than the thickness of the conductive part 149 extended from the first metal frame 107.

As shown in FIG. 11, for example, the sidewall recess 156 is formed such that its inner length in the X-axis direction of the drawing is approximately equal to a total of the widths of two conductive parts 149 and the distance between them when seen from the sidewall 153b. Accordingly, it is possible to make the protrusion to the plastic frame 106 as small as possible, thereby reducing the size of the LCD device 101.

Method of Manufacturing LCD Device

A method of manufacturing the LCD device having the above-mentioned configuration is the same as that of the first embodiment, except that the conductive part is inclined inward, which will now be described.

For example, when the first metal frame 107 is set to cover the liquid crystal panel 2 and the plastic frame 106 that receives the liquid crystal panel 2, the edge 150 of the conductive part 149 that is extended to be inclined inward comes into contact with the sidewall recess 156 of the second metal frame 108, and the first metal frame 107 is horizontally moved such that the angle θ between the conductive part 149 and the sidewall 144b is approximately equal to zero.

As a result, as shown in FIG. 12, since the inner surface of the conductive part 149 and the outer wall surface of the sidewall recess 156 of the second metal frame 108 match each other in the Z-axis direction of the drawing, in this state, the first metal frame 107 is moved to the second metal frame 108. Accordingly, for example, as shown in FIG. 12, the first metal frame 107 is set to cover the liquid crystal panel 2 and the plastic frame 106 that receives the liquid crystal panel 2, and the conductive part 149 reliably comes into contact with the outer wall of the sidewall recess 156 of the second metal frame 108, thereby electrically connecting the first and second metal frames 107 and 108 to each other.

The subsequent manufacturing method is the same as that of the first embodiment and a detailed description thereof will thus be omitted.

According to the present modified example, since the conductive part 149 is composed of a plate spring and is deformably configured to be inwardly inclined, it is possible to reliably electrically connect the first and second metal frames 107 and 108 to each other by means of the conductive part 149. Further, since the conductive part 149 does not protrude to the outside, it is possible to reduce the size of the LCD device 101.

In addition, since the conductive part 149 comes into contact with the sidewall recess 156 of the second metal frame 108 from the outer side of the sidewall recess, it is possible to easily set the first metal frame 107 to the plastic frame 106 and the second metal frame 108, and to reduce the manufacturing cost of the LCD device 101.

MODIFIED EXAMPLE 2

An LCD device according to modified example 2 of the first embodiment of the invention will now be described. The modified example 2 is different from the first embodiment in the shape of a conductive part of the second metal frame. In the modified example 2, the same components as those in first embodiment are denoted by the same reference numerals and a detailed description thereof will be omitted.

Figure 14:
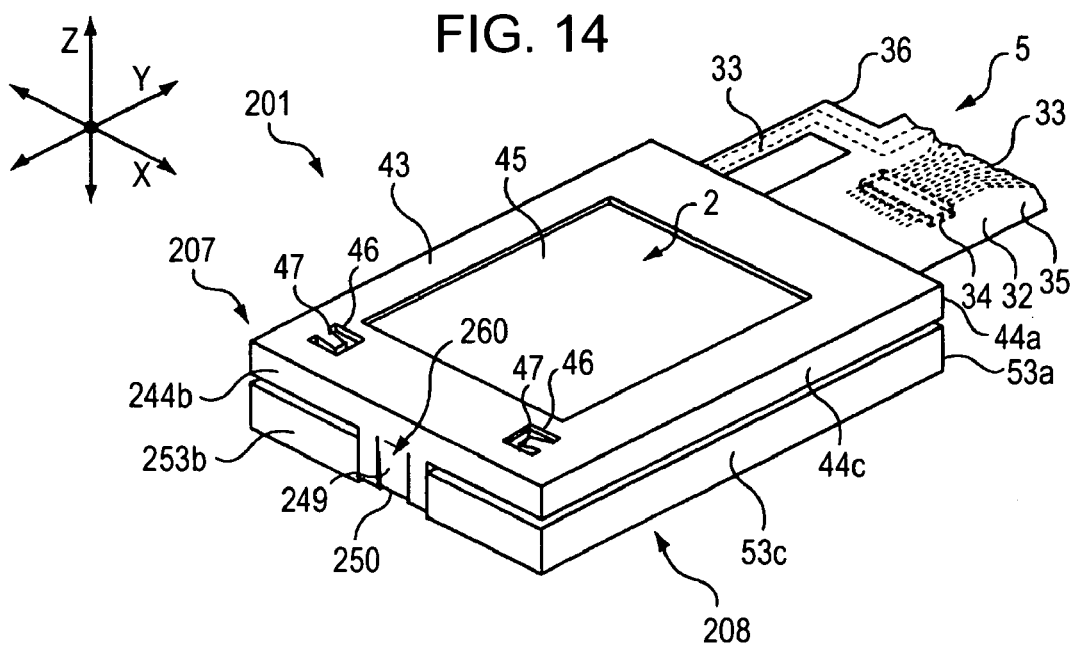
FIG. 14 is a perspective view schematically showing an LCD device according to modified example 2.
Figure 15:
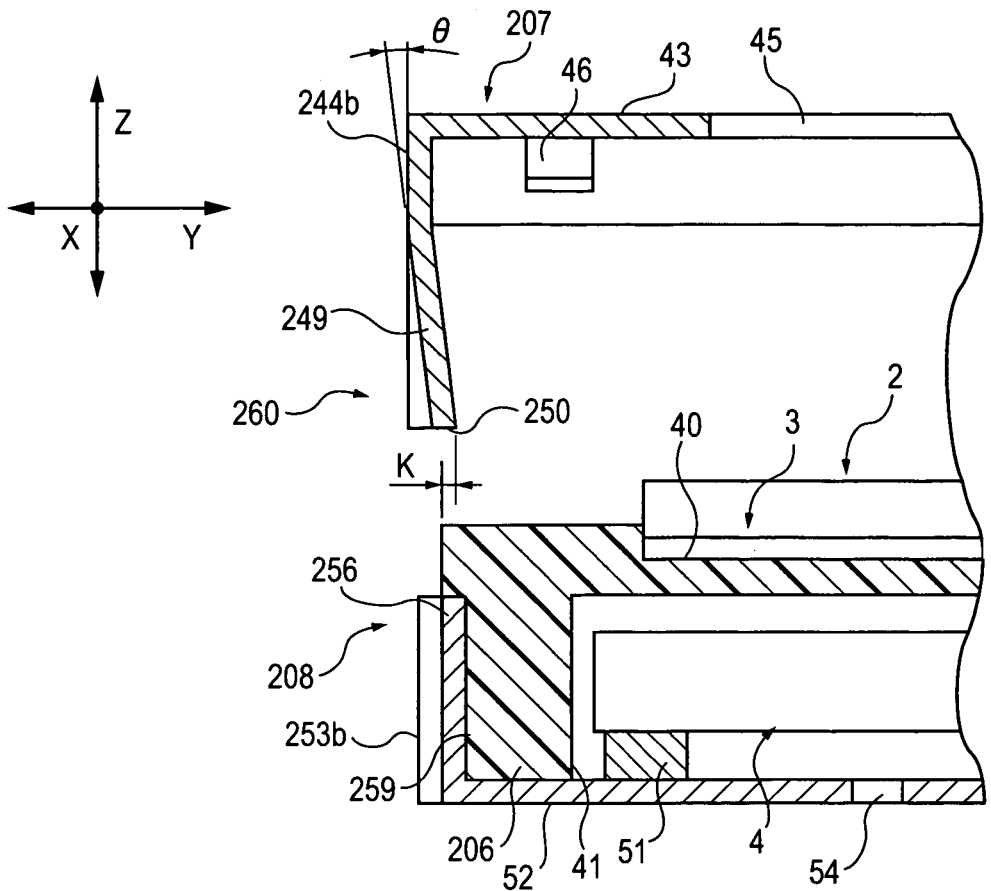
FIG. 15 is an enlarged explanatory view of a conductive part according to the modified example 2.

FIG. 14 is a perspective view schematically showing an LCD device according to the modified example 2. FIG. 15 is an enlarged view for explaining a conductive part according to the modified example 2.

Configuration of LCD Device

As shown in FIGS. 14 and 15, for example, an LCD device 201 includes a liquid crystal panel 2 that is a first electro-optical panel, an illuminating unit 3 that emits light on the liquid crystal panel, a soundgenerating unit 4 that is provided as an electronic part to be adjacent to the liquid crystal panel 2, a flexible substrate 5 that is a circuit board electrically connected to the liquid crystal panel 2, a plastic frame 206 that receives the liquid crystal panel 2 or the soundgenerating unit 4, and first and second metal frames 207 and 208 between which the plastic frame 206 receiving the liquid crystal panel 2, the soundgenerating unit 4, and the like is inserted.

The plastic frame 206 has, for example, a rectangular shape, and includes an illuminating unit recess 40 formed on the liquid crystal panel side, a soundgenerating unit recess 41 formed on an opposite side thereof, and a frame guide groove 42 formed in the side surface on the flexible substrate side so as to pass through the branch part 36 of the flexible substrate 5. The plastic frame 206 is formed to be received between the first and second metal frames 207 and 208.

As shown in FIG. 15, for example, the plastic frame 206 has a frame recess 259 that is formed to be indented at the middle of a sidewall on the flexible substrate side and the opposite side. The frame recess 259 is formed so that the second metal frame 208 can receive a portion protruded in a box shape on the plastic frame 206 side.

As shown in FIGS. 14 and 15, for example, the first metal frame 207 covers and presses the liquid crystal panel 2 received in the plastic frame 206 from the upper side of the drawing, such that the liquid crystal panel is fixed. The first metal frame 207 has a planar portion 43 that has a rectangular shape and serves as the display surface, and a sidewall 244 that is formed to be orthogonal to the planar portion 43 toward the second metal frame 208.

The sidewall 244 has, for example, a sidewall 44a formed on the flexible substrate side, a sidewall 244b formed to face the sidewall 44a, and two sidewalls 244c that face each other and are interposed between the sidewalls 44a, 244b.

As shown in FIGS. 14 and 15, for example, the sidewall 244b has a sidewall extended part 260, which is part of the sidewall 244b extended from its central portion in a rectangular shape, and the conductive part 249, which is a plate spring obtained by cutting and bending the sidewall extended part 260.

As shown in FIG. 15, the conductive part 249 is formed to be inwardly inclined by θ degree starting from the origin, at which the conductive part 249 is extended, toward the second metal frame 208 of the sidewall 244b. The inner surface of an edge 250 of the conductive part 249 is inwardly projected from an outer sidewall of a recess of the second metal frame 208 to be described below by the gap K indicated in FIG. 15.

With such a configuration, when the sidewall extended part 260 is inserted into the recess of the second metal frame 208 as described below, the conductive part 249 is pressed back to a direction opposite to the projected direction by the projected portion, for example, the gap K. Accordingly, the stress due to the elastic force reacting against the push back always presses the conductive part 249 to the inner sidewall of the recess of the second metal frame 208 such that the conductive part 249 reliably comes into contact with the inner sidewall of the recess of the second metal frame 208.

For example, even when a component tolerance variation exists, at least the edge 250 of the conductive part 249 can come into contact with the second metal frame 208 within the projected portion of the conductive part 249, for example, within the range of K of FIG. 15. Accordingly, the first metal frame 207 can be reliably electrically connected with the second metal frame 208.

For example, when the first and second metal frames 207 and 208 are set in the plastic frame 206, the length of the conductive part 249 is formed such that the edge 250 of the conductive part 249 is located a little higher than the outer bottom surface of the second metal frame 208. Accordingly, even when a component tolerance variation exists, it is possible to prevent the edge 250 from deviating from the outer wall surface of the second metal frame 208. In contrast, even when the conductive part 249 is too short, it is possible to prevent the conductive part 249 from deviating from the recess of the second metal frame 208 due to the component tolerance variation or vibration.

In addition, while the above-mentioned embodiment describes that a single conductive part 249 are extended, the invention is not limited thereto, but, for example, two or more conductive parts may be provided.

As shown in FIGS. 11 and 12, for example, the second metal frame 208 covers and presses the soundgenerating unit 4 and a supporting body 51 for supporting the soundgenerating unit 4, which are received in each plastic frame 206, from the bottom side of the drawings such that the soundgenerating unit 4 and the supporting body 51 are fixed. The second metal frame 208 has a rectangular planar portion 52, and a sidewall 253 that is formed to be orthogonal to the four sides of the planar portion 52 toward the first metal frame 207.

As shown in FIG. 14, for example, the sidewall 253 has a sidewall 53a formed on the flexible substrate side, a sidewall 253b formed on the opposite side of the sidewall 53a, and two sidewalls 53c which are formed between the sidewalls 53a, 253b and face each other.

As shown in FIGS. 14 and 15, for example, the sidewall 253b has a sidewall recess 256 for receiving the sidewall extended part 260 in its central portion.

For example, the sidewall recess 256 is indented in a box shape from the outside of the sidewall 253b toward the inside. The sidewall recess 256 is formed to be a little larger than the thickness of the sidewall extended part 260 extended from the first metal frame 207.

As shown in FIG. 14, for example, the sidewall recess 256 is formed such that its inner length in the X-axis direction of the drawing is approximately equal to the horizontal width of the sidewall extended part 260 when seen from the sidewall 253b. Accordingly, it is possible to make the protrusion to the plastic frame 206 as small as possible, thereby reducing the size of the LCD device 201.

Method of Manufacturing LCD Device

A method of manufacturing the LCD device having the above-mentioned configuration is the same as that of the modified example 1, and a detail description thereof will thus be omitted.

According to the modified example, since the conductive part 249 is a bent portion of a plate spring obtained by extending the sidewall extended part 260, which is a part of the sidewall 244b of the first metal frame 207, to the second metal frame 208 and by cutting and bending the plate spring inwardly from the sidewall extended part 260, it is stronger in intensity compared to a case where the conductive part 249 is solely projected to the second metal frame 208. In addition, since the sidewall extended part 260 other than the conductive part 249 becomes a guide of the conductive part 249, it is easier to assemble the first metal frame 207 into the second metal frame 208.

According to the present modified example, since the conductive part 249 is cut and bent and is deformably configured to be inwardly inclined, it is possible to cope with some component tolerance variation and to reliably electrically connect the first and second metal frames 207 and 208 to each other.

In addition, since the conductive part 249 is formed by cutting and bending the sidewall extended part 260 that is part of the sidewall 244b, it is easy to manufacture the conductive part 249 and the waste of resources is reduced.

MODIFIED EXAMPLE 3

Next, an LCD device according to modified example 3 of the first embodiment of the invention will now be described. The modified example 3 is different from the first embodiment in that a conductive part is provided on a flexible substrate side, which will be described in detail. In the modified example 3, the same components as those in first embodiment are denoted by the same reference numerals and a detailed description thereof will thus be omitted.

Figure 16:
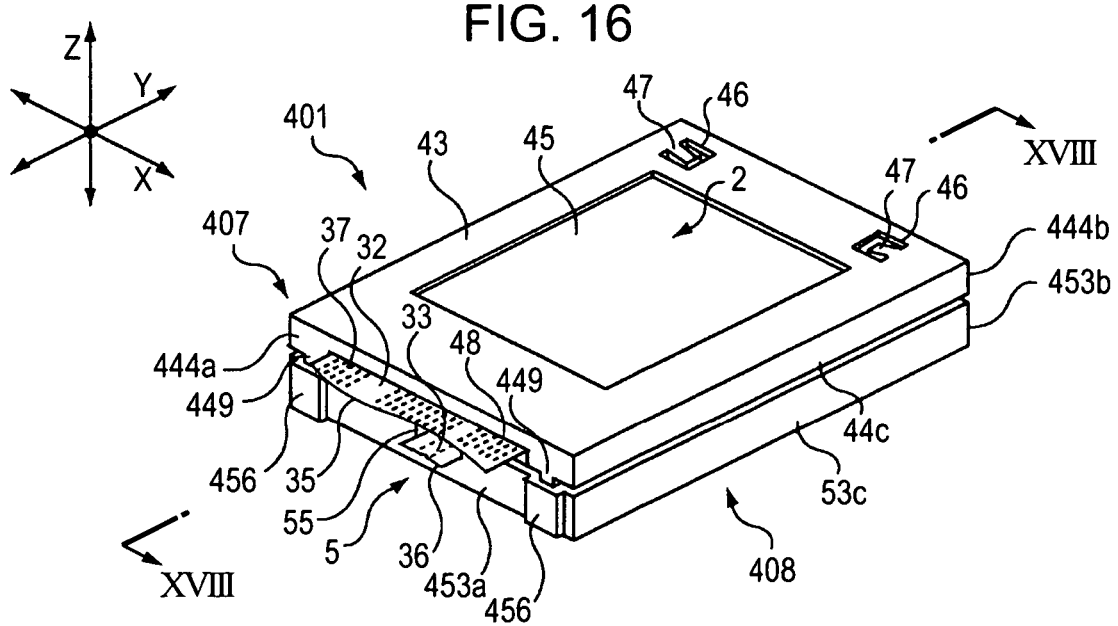
FIG. 16 is a perspective view of an LCD device according to modified example 3.

FIG. 16 is a perspective view of an LCD device according to the modified example 3. FIG. 17 is a perspective view seen from the opposite side of FIG. 16. FIG. 18 is a cross-sectional view taken along the line XVIII-XVIII of FIG. 16 (soundgenerating unit being not cut away). FIG. 19 is an explanatory view for showing a projected conductive part.

Configuration of LCD Device

As shown in FIGS. 16 and 18, for example, an LCD device 401 includes a liquid crystal panel 2 that is a first electro-optical panel, an illuminating unit 3 that emits light on the liquid crystal panel 2, a soundgenerating unit 4 that is provided as an electronic part to be adjacent to the liquid crystal panel 2, a flexible substrate 5 that is a circuit board electrically connected to the liquid crystal panel 2, a plastic frame 6 that receives the liquid crystal panel 2 or the soundgenerating unit 4, and first and second metal frames 407 and 408 between which the plastic frame 6 receiving the liquid crystal panel 2, the soundgenerating unit 4, or the like is inserted.

As shown in FIGS. 16 and 18, for example, the first metal frame 407 covers and presses the liquid crystal panel 2 received in the plastic frame 6 from the upper side of the drawing, such that the liquid crystal panel is fixed. The first metal frame 407 has a planar portion 43 having a rectangular shape, and a sidewall 444 that is formed to be orthogonal to the planar portion 43 toward the second metal frame 408.

The sidewall 444 has, for example, a sidewall 444a formed on the flexible substrate side, a sidewall 444b formed to face the sidewall 444a, and two sidewalls 44c that face each other and are interposed between the sidewalls 444a, 444b.

As shown in FIGS. 16 and 18, for example, the sidewall 444a has conductive parts 449 on the left and right sides of the first metal frame recess 48, so as to separate from the first metal frame recess 48 provided on the central portion. Each conductive part 449 is an elastic plate spring having a rectangular shape that is extended toward the second metal frame 408.

As shown in FIG. 19, the conductive part 449 is formed to be outwardly inclined by θ degree starting from the origin, at which the conductive part 449 is extended, toward the second metal frame 408 of the sidewall 444a. The outer surface of an edge 450 of the conductive part 449 is projected from an inner wall of a recess of the second metal frame 408 by the gap M indicated in FIG. 19.

With such a configuration, when the conductive part 449 is inserted into the recess of the second metal frame 408 as described below, the conductive part 449 is pressed back to a direction opposite to the projected direction by the projected portion, for example, the gap M. Accordingly, by the elastic force of the pressed conductive part 449, the conductive part 449 reliably comes into contact with the inner wall of the recess of the second metal frame 408.

For example, even when a component tolerance variation exists, at least the edge 450 of the conductive part 449 can come into contact with the second metal frame 408 within the projected portion of the conductive part 449, for example, within the range of M of FIG. 19. Accordingly, the first metal frame 407 can be reliably electrically connected with the second metal frame 408.

For example, when the first and second metal frames 407 and 408 are set in the plastic frame 6, the length of the conductive part 449 is formed such that the edge 450 of the conductive part 449 is located a little higher than the inner bottom surface of the second metal frame 408. Accordingly, even when a component tolerance variation exists, it is possible to prevent the edge 450 from coming into contact with the inner bottom surface of the second metal frame 408, such that the first metal frame 407 is not raised from the plastic frame 6. In contrast, even when the conductive part 449 is too short, it is possible to prevent the conductive part 449 from deviating from the recess of the second metal frame 408 due to the component tolerance variation or vibration.

As shown in FIG. 16, for example, the two conductive parts 449 are separated from each other. Accordingly, even when any one of the two conductive parts 449 does not come into contact with the second metal frame 408 due to vibrating or the like, the first and second metal frames 407 and 408 can be electrically connected with each other by means of the remaining one of the conductive parts 449. In addition, since the two conductive parts 449 are separated from each other, it is possible to reliably electrically connect the first and second metal frames 407 and 408 to each other even though the sidewall is partly distorted.

In addition, while the above-mentioned embodiment describes that two conductive parts 449 are provided, the invention is not limited thereto, but, for example, one or at least three conductive parts may be provided.

As shown in FIG. 17, for example, the sidewall 444b does not have an extended conductive part, unlike the sidewall 44b of the first embodiment. The sidewall 444b may have an extended conductive part, like the sidewall 44b of the first embodiment. With such a configuration, it is possible to reliably electrically connect the first and second metal frames 407 and 408 to each other.

As shown in FIGS. 16, 17 and 18, for example, the second metal frame 408 covers and presses the soundgenerating unit 4 and a supporting body 51 for supporting the soundgenerating unit 4, which are received in each plastic frame 6, from the bottom side of the drawings such that the soundgenerating unit 4 and the supporting body 51 are fixed. The second metal frame 408 has a rectangular planar portion 52, and a sidewall 453 that is formed to be orthogonal to the four sides of the planar portion 52 toward the first metal frame 7.

As shown in FIGS. 16 and 18, for example, the sidewall 453 has a sidewall 453a formed on the flexible substrate side, a sidewall 453b formed on the opposite side of the sidewall 453a, and two sidewalls 53c which are formed between the sidewalls 453a, 453b and face each other.

As shown in FIGS. 16 and 18, for example, the sidewall 453a has sidewall recesses 456 for receiving the conductive parts 449 on the left and right sides of the second metal frame recess 55, so as to separate from the second metal frame recess 55 provided on the central portion.

As shown in FIG. 16, for example, the sidewall recess 456 is indented in a box shape from the inside of the sidewall 453a toward the outside. The sidewall recess 456 is formed to be a little larger than the thickness of the conductive part 449 extended from the first metal frame 407. Accordingly, it is easy to insert the conductive part 449 into the sidewall recess 456, and to cope with some component tolerance variation.

As shown in FIG. 16, for example, the sidewall recess 456 is formed such that its inner length of the X-axis direction is approximately equal to the width of the conductive parts 449 when seen from the sidewall 453a. Accordingly, it is possible to make the protrusion from the second metal frame 408 as small as possible, thereby reducing the size of the LCD device 401.

On the other hand, as shown in FIG. 17, for example, the sidewall 453b does not have a sidewall recess for receiving a conductive part, unlike the sidewall 53b of the first embodiment. When a conductive part is extended to the sidewall 444b, the sidewall 453b may have a sidewall recess for receiving the conductive part, like the sidewall 53b of the first embodiment. With such a configuration, it is possible to reliably electrically connect the first and second metal frames 407 and 408 to each other.

Method of Manufacturing LCD Device

A method of manufacturing the LCD device having the above-mentioned configuration is the same as that of the first embodiment, except that a conductive part is extended to a flexible substrate side, which will be described.

For example, when the first metal frame 407 is set to cover the liquid crystal panel 2 and the plastic frame 6 that receives the liquid crystal panel 2, the edge 450 of the conductive part 449 that is extended to be inclined outward is inserted between the sidewall recess 456 of the second metal frame 408 and the plastic frame 6, and the first metal frame 407 is horizontally moved (in the Y-axis direction of FIG. 19) such that the angle θ between the conductive part 449 and the sidewall 444a is approximately equal to zero.

As a result, since the inner surface of the sidewall 444a and the outer surface of the plastic frame 6 match each other in the Z-axis direction of FIG. 19, in this state, the first metal frame 407 is moved to the second metal frame 408 (in the Z-axis direction of FIG. 19) such that the conductive part 449 is inserted into the gap between the sidewall recess 456 and the plastic frame 6. Accordingly, for example, as shown in FIG. 18, the first metal frame 407 is set to cover the liquid crystal panel 2 and the plastic frame 6 that receives the liquid crystal panel 2, and the conductive part 449 reliably comes into contact with the inner wall of the sidewall recess 456 of the second metal frame 408, thereby electrically connecting the first and second metal frames 407 and 408 to each other.

The subsequent manufacturing method is the same as that of the first embodiment and a detailed description thereof will thus be omitted.

According to the present modified example, the conductive part 449 is extended from the flexible substrate side toward the second metal frame 408. Accordingly, for example, even though the sidewall recess 456 for receiving the conductive part 449 is provided in the second metal frame 408 such that the outer surface of the sidewall recess 456 is projected, if it is arranged so as not to interfere with the flexible substrate 5, since space is reserved for the flexible substrate and thus the substrate does not disturb other components, it is possible to further reduce the size of the electro-optical device.

The conductive part 449 is pressed to the inner surface of the sidewall recess 456 of the second metal frame 408 by the elastic force so as to come into contact with the inner surface, such that the first and second metal frames 407 and 408 are electrically connected with each other. Accordingly, even when a component tolerance variation exists, the conductive part 449 of the first metal frame 407 is pressed to, for example, the second metal frame 408 by the elastic force, such that the first and second metal frames are reliably electrically connected with each other. As a result, since it is not required to exactly set the component tolerance, it is possible to reduce the manufacturing cost.

Second Embodiment

An LCD device according to a second embodiment of the invention will now be described. In the present embodiment, a liquid crystal panel, which is a second electro-optical panel, is additionally provided instead of a soundgenerating unit, which is an electronic part. Also, in this embodiment, among all the components containing the added liquid crystal panel, the same components as those of the first embodiment are denoted by the same reference numerals, and a detailed description thereof will be omitted.

FIG. 20 is a cross-sectional view of an LCD device according to the second embodiment of the invention.

Configuration of LCD Device

For example, as shown in FIG. 20, an LCD device 501 includes a first liquid crystal panel 502, which acts as a first electro-optical panel, a first illuminating unit 503, which emits light on the first liquid crystal panel 502, a second liquid crystal panel 570, which is an electronic part provided to be adjacent to the first liquid crystal panel 502 and whose display surface is provided in a direction opposite to a display surface of the first liquid crystal panel 502, a second illuminating unit 571, which emits light on the second liquid crystal panel 570, a first flexible substrate 505, which is a circuit board electrically connected to the first liquid crystal panel 502, a second flexible substrate 572, which is a circuit board electrically connected to the second flexible substrate 570, a plastic frame 506, which receives the first and second liquid crystal panels 502 and 570 or the like, and a first metal frame 507 and a second metal frame 508, between which the plastic frame 506 receiving the first and second liquid crystal panels 502 and 570 and the like is inserted. The LCD device 501 further includes additional elements (not shown), if necessary, in addition to the first and second metal frames 507 and 508.

As shown in FIGS. 5 and 20, the first and second liquid crystal panels 502 and 507 include a pair of substrates, i.e., a first substrate 10 and a second substrate 11, which are joined with a sealing material 9, and an electro-optical material, e.g., a STN (Super Twisted Nematic) liquid crystal 12, which is injected between the substrates. In addition, a base layer, a reflective layer, a colored layer, a light-shielding layer and the like, which are not shown, are provided on any one of the first and second substrates 10 and 11, if necessary.

As shown in FIG. 5, for example, on the first substrate 10, a plurality of common electrodes 13 is formed in a predetermined pattern on the liquid crystal side. In addition, an overcoat layer 14 is formed on the common electrode 13 disposed on the liquid crystal side, and an alignment layer 15 is further formed on the liquid crystal side. Further, a polarizer 16 and so on are formed on the outside (the opposite side of the liquid crystal) of the first substrate.

On the other hand, for example, as shown in FIG. 5, on the second substrate 11, a plurality of segment electrodes 17 is formed in a predetermined pattern on the liquid crystal side. An overcoat layer 18 is formed on the segment electrode 17. An alignment layer 19 is further formed on the liquid crystal side. Also, a polarizer 20 is formed on the outside (the opposite side of the liquid crystal) of the second substrate 11.

As shown in FIG. 5, the first and second substrates 10 and 11 are plate-shaped members each of which is made of light-transmissive material, for example, glass or synthetic resin. The second substrate 11 has a protrusion 21 that is projected outward (Y-axis direction in FIG. 5) with respect to the first substrate 10.

As shown in FIG. 5, for example, on the protrusion 21, a plurality of external terminals 22 is extended from an area, in which the segment electrode 17 and the common electrode 13 are surrounded by the sealing material 9, to the protrusion 21, and is electrically connected to each electrode.

As shown in FIGS. 5 and 20, for example, the first and second illuminating units 503 and 571 are backlight units that emit light on the second substrate 11. Each of the first and second illuminating units 503 and 571 includes a light source 23, a light guide plate 24, two prism sheets 25 and 26, a diffusing sheet 27, and a reflective sheet 28, which are not shown. The prism sheet 25 adheres to the polarizer 20 of the second substrate 11.

As shown in FIG. 20, a wiring pattern 33 is formed on a base member 32 of each of the first and second flexible substrates 505 and 572, and a liquid crystal driving IC 34 (not shown) is mounted on each of the first and second flexible substrates 505 and 572.

Each of the first and second flexible substrates 505 and 572 has a plurality of liquid crystal panel connecting terminals 537 at its end portion on the liquid crystal panel side, and is electrically connected to the external terminal 22 of the protrusion 21 of each of the first and second liquid crystal panels 502 and 570 through an external ACF 38 (anisotropic conductive film).

As shown in FIG. 20, for example, the liquid crystal panel connecting terminals 537 are electrically connected to the wiring pattern 33, and are electrically connected to the liquid crystal driving IC 34 through a connecting terminal (not shown), the ACF, or the like on the opposite side of the liquid crystal panel of the wiring pattern 33.

As shown in FIG. 20, for example, the plastic frame 506 has a rectangular shape. The plastic frame 506 has a first illuminating unit recess 540 formed on the first liquid crystal panel side, and a second illuminating unit recess 541 formed on an opposite side thereof. The plastic frame 506 is formed to be received between the first and second metal frames 507 and 508.

As shown in FIG. 20, for example, the first and second illuminating unit recesses 540 and 541 are formed such that a bottom surface of each of the box-shaped illuminating unit recesses has almost the same size as that of each of the first and second illuminating units 503 and 571 which is formed in a planar direction (in the XY-axis direction of FIG. 20). The reflective sheet 28 of the illuminating unit is attached to the bottom surface, for example, with a double-faced adhesive tape or the like. As shown in FIG. 20, the first and second illuminating unit recesses 540 and 541 are formed to be deep enough to receive a part of the liquid crystal panel attached to the prism sheet 25 of the illuminating unit. In addition, a part of the liquid crystal panel attached to the illuminating unit, together with the illuminating unit, is received in the first and second illuminating unit recesses 540 and 541.

As shown in FIG. 20, for example, the first metal frame 507 covers and presses the first liquid crystal panel 502 received in each of the plastic frames 506 from the outside of the drawings such that the first liquid crystal panel 502 is fixed. The first metal frame 507 has a rectangular planar portion 543, and a sidewall 544 that is formed to be orthogonal to the four sides of the planar portion 543 toward the second metal frame 508.

As shown in FIG. 20, for example, a first opening 545 and two push spring parts 46 are provided on the planar portion 543. The first opening 545 provided in the middle of the planar portion 543 acts as a liquid crystal display surface. The two push spring parts 46 are provided between the first opening 545 and edges of one side on the opposite side of the flexible substrate of the planar portion 543.

As shown in FIG. 20, for example, the sidewall 544 has a sidewall 544a formed on the flexible substrate side, a sidewall 544b formed on the opposite side of the sidewall 544a, and two sidewalls 544c (not shown) which are formed between the sidewalls 544a, 544b and face each other.

As shown in FIG. 20, for example, the sidewall 544a has a first metal frame recess 548 in its central portion so that a connecting terminal of the first flexible substrate 505 can be inserted.

As shown in FIG. 20, for example, the sidewall 544b has two separated conductive parts 49 each of which is extended from the central portion toward the second metal frame 508 and is an elastic plate spring.

The conductive part 49 is formed to be outwardly inclined by θ degree starting from the origin, at which the conductive part 49 is extended, toward the second metal frame 508 of the sidewall 544b. The outer surface of an edge 50 of the conductive part 49 is slightly projected from an inner sidewall of a recess of the second metal frame 508 to be described below.

With such a configuration, when the conductive part 49 is inserted into the recess of the second metal frame 508 as described below, the conductive part 49 is pressed back to a direction opposite to the projected direction by the projected distance. Accordingly, the stress due to the elastic force reacting against the push back always presses the conductive part 49 to the inner sidewall of the recess of the second metal frame 508 such that the conductive part 49 reliably comes into contact with the inner sidewall of the recess of the second metal frame 508.

As shown in FIG. 20, for example, the second metal frame 508 covers and presses the second liquid crystal panel 570, which are received in each plastic frame 506, from the outside of the drawing, such that the second liquid crystal panel 570 is fixed. The second metal frame 508 has a rectangular planar portion 552 serving as the display surface, and a sidewall 553 that is formed to be orthogonal to the four sides of the planar portion 552 toward the first metal frame 507.

As shown in FIG. 20, in the planar portion 552, a second opening 573, which is a liquid crystal display surface, is provided at the central portion of the planar portion 552. Two push spring parts 46 are provided between the second opening 573 and edges of one side of the planar portion 552 on the opposite side of the flexible substrate.

As shown in FIG. 20, for example, the sidewall 553 has a sidewall 553a formed on the flexible substrate side, a sidewall 553b formed on the opposite side of the sidewall 553a, and two sidewalls 553c (not shown) which are formed between the sidewalls 553a, 553b and face each other.

As shown in FIG. 20, for example, the sidewall 553a has a second metal frame recess 555 in the central portion so that a connecting terminal of the second flexible substrate 572 can be inserted.

As shown in FIG. 20, for example, the sidewall 553b has a sidewall recess 56 for receiving the conductive part 49 in the central portion.

As shown in FIG. 20, for example, the sidewall recess 56 is indented in a box shape from the inside of the sidewall 553b toward the outside. The sidewall recess 56 is formed to be a little larger than the thickness of the conductive part 49 extended from the first metal frame 507. Accordingly, it is possible to easily insert the conductive part 49 into the sidewall recess 56, and to cope with some component tolerance variation.

Similarly to the first embodiment, for example, the LCD device 501 is configured such that the second metal frame 508 is electrically connected to a middle frame of an electronic apparatus, such as a mobile phone, by means of a connecting part (not shown). Accordingly, the first and second metal frames 507 and 508, which have the same potential by the conductive part 49, are put to earth.

Method of Manufacturing LCD Device

A method of manufacturing an LCD device having the above-mentioned configuration is the same as that of the first embodiment, except that the second liquid crystal panel is provided instead of the soundgenerating unit, which will be described.

First, the first and second liquid crystal panels 502 and 570 are manufactured. The method of manufacturing the panels is the same as that of the first embodiment, and a detailed description thereof will thus be omitted.

Next, the first and second flexible substrates are manufactured.

For example, a predetermined wiring pattern 33, the liquid crystal panel connecting terminals 537, and other connecting terminals are formed on the base member 32 formed by a mold. Next, the liquid crystal driving IC 34 is mounted on the connecting terminals through ACF.

Other ICs or capacitors are mounted, and the liquid crystal panel connecting terminals 537 of the first and second flexible substrates 505 and 572 are electrically connected to the external terminal 22 of the liquid crystal panel through the external ACF 38.

Next, for example, the reflective sheet 28, the light guide plate 24 to which the light source 23 is attached, the diffusing sheet 27, and the prism sheets 26 and 25 are sequentially mounted on a bottom surface of the first illuminating unit recess 540 of the plastic frame 506. The first liquid crystal panel 502 to which the first flexible substrate 505 is connected is provided thereon.

In addition, the reflective sheet and the like are mounted on a bottom surface of the second illuminating unit recess 54 of the plastic frame 506. The second liquid crystal panel 570 to which the second flexible substrate 572 is connected is provided thereon.

Next, as shown in FIG. 20, for example, the second metal frame 508 is set to cover the second liquid crystal panel 570 and the plastic frame 506 that receives the liquid crystal panel. On the opposite side, the first metal frame 507 is set to cover the first liquid crystal panel 502 and the plastic frame 506 that receives the liquid crystal panel.

At this time, the edge 50 of the conductive part 49 that is extended to be inclined outward is inserted into the gap between the sidewall recess 56 of the second metal frame 508 and the plastic frame 506, and in this state, the first metal frame 507 is moved such that the angle θ between the conductive part 49 and the sidewall 544b is approximately equal to zero.

As a result, since, in the second metal frame 508, the inner surface of the sidewall 544b and the outer surface of the plastic frame 506 match each other in the Z-axis direction of FIG. 20, in this state, the first metal frame 507 is moved in the Z-axis direction of the drawing such that the conductive part 49 is inserted into the gap between the sidewall recess 56 of the second metal frame 508 and the plastic frame 506. Accordingly, for example, as shown in FIG. 20, the first metal frame 507 is set to cover the liquid crystal panel 502 and the plastic frame 506 that receives the liquid crystal panel 502, and the conductive part 49 reliably comes into contact with the inner wall of the sidewall recess 56 of the second metal frame 508, thereby electrically connecting the first and second metal frames 507 and 508 to each other.

As shown in FIG. 20, when the first metal frame 507 is moved to the second metal frame 508, the circumference of the first opening 545 of the first metal frame 507 presses the non-displaying area of the first substrate 10 from the outside as shown in FIG. 20, and the first liquid crystal panel 502 is fixed to the first illuminating unit recess 540 of the plastic frame 506 in each first illuminating unit 503. At this time, similarly, the circumference of the second opening 573 of the second metal frame 508 presses the non-displaying area of the first substrate 10 from the outside as shown in FIG. 20, and the second liquid crystal panel 570 is fixed to the second illuminating unit recess 541 of the plastic frame 506 in each second illuminating unit 571.

On the other hand, when the first metal frame 507 is moved to the second metal frame 508, the push springs 47 of two push spring parts 46 provided in the first and second metal frames 507 and 508 come into contact with the plastic frame 506 as shown in FIG. 20, and it is possible to prevent rattling between the plastic frame 506 and the first and second metal frames 507 and 508 by the elastic force of the springs.

As described above, the first and second metal frames 507 and 508 are set in the plastic frame 506 and other required components are fixed, thereby completing the LCD device 501.

For example, the LCD device 501 is configured such that the second metal frame 508 is electrically connected to a middle frame of an electronic apparatus, such as a mobile phone, by means of a connecting part (not shown). Accordingly, the first and second metal frames 507 and 508, which have the same potential by the conductive part 49, are put to earth.

According to the present embodiment, the first and second liquid crystal panels 502 and 570 are provided to be fixed to the plastic frame 506, which is provided between the first and second liquid crystal panels 502 and 570. In addition, for example, the elastic conductive part 49 is extended from the first metal frame 507 to the second metal frame 508 to reliably electrically connect the first and second metal frames 507 and 508 to each other. Accordingly, even when some component tolerance variation exists, the first and second metal frames 507 and 508 can be reliably electrically connected to each other. As a result, it is possible to prevent the liquid crystal panel or the circuit board from malfunctioning.

Third Embodiment

Electronic Apparatus

An electronic apparatus, which includes any one of the above-mentioned LCD devices 1, 101, 201, 401, 501, according to a third embodiment of the invention will now be described. The same components as those of the first embodiment are denoted by the same reference numerals as those of the first embodiment, and a detailed description thereof will be omitted.

FIG. 21 schematically shows a display control system of an electronic apparatus according to the third embodiment of the invention.

The electronic apparatus 300 includes a liquid crystal panel 2 and a display control circuit 390 as a display control system, for example, as shown in FIG. 21. The display control circuit 390 includes a display information output source 391, a display information processing circuit 392, a power supply circuit 393, and a timing generator 394.

The liquid crystal panel 2 includes a driving circuit 361 that drives a display region I.

The display information output source 391 includes a memory, which is composed of ROM (Read Only Memory), RAM (Random Access Memory), or the like, a storage unit, which is composed of a magnetic recording disk, an optical recording disk, or the like, and a tuning circuit, which tunes and outputs a digital image signal. On the basis of various clock signals generated by the timing generator 394, the display information output source 391 is configured to supply display information to the display information processing circuit 392 in the form of an image signal having a predetermined format.

The display information processing circuit 392 includes various known circuits such as a serial/parallel conversion circuit, an amplification•inversion circuit, a rotation circuit, a gamma correction circuit, a clamp circuit, and the like. The display information processing circuit 392 processes input display information, and applies image information to the driving circuit 361 together with a clock signal CLK. The power supply circuit 393 supplies a predetermined voltage to each of the above-mentioned components.

According to the present embodiment, the first metal frame 7 of the LCD device 1 used in the electronic apparatus 300 has the elastic conductive part 49 which is extended toward the second metal frame 8, and the conductive part 49 is pressed against and comes into contact with the inner surface of the sidewall recess 56 of the second metal frame 8 by the elastic force such that the first and second metal frames 7 and 8 are electrically connected with each other. Accordingly, even though some component tolerance variation exists, the conductive part 49 of the first metal frame 7 is pressed against, for example, the second metal frame 8 by the elastic force. Accordingly, it is possible to reliably electrically connect the first and second metal frames 7 and 8 to each other and to further reduce the size of the electronic apparatus 300.

Since the conductive part 49 is extended from the sidewall 44b, which is formed on the opposite side of the flexible substrate, toward the sidewall 53b of the second metal frame 8, for example, there is a margin of space because the flexible substrate 5 is not connected. Accordingly, it is possible to freely arrange the conductive part 49 or the sidewall recess 56 of the second metal frame 8 that comes into contact with the conductive part 49.

In particular, since an electronic apparatus is recently required to be compact and high-quality, the invention that provides such an electronic apparatus is valuable.

Examples of the electronic apparatus include a mobile phone, a personal computer, a touch panel equipped with an LCD device, a projector, a liquid crystal television, a viewfinder-type or monitor-direct-view-type videotape recorder, a car navigation, a pager, an electronic organizer, a calculator, a word processor, a workstation, a television telephone, a POS terminal, and the like. The above-mentioned LCD devices 1, 101, 201, 401, 501 can be applied as display units of the above-mentioned electronic apparatuses.

In addition, the electro-optical device and the electronic apparatus according to the invention is not limited to the above-mentioned examples and may be variously changed without departing from the scope of the invention. Further, a combination of the embodiments and the modified examples may be employed without departing from the scope of the invention.

While the invention has been described with reference to the exemplary embodiments thereof, it will be understood by those skilled in the art that various changes in form and details may be made therein without departing from the scope of the invention.

For example, while the above-mentioned embodiments or modified examples have described a passive matrix type LCD device, the invention is not limited thereto. For example, a thin film transistor or diode active matrix type LCD device may be employed. Further, the invention is not limited to a transflective type LCD device, but may include a reflective or a transmissive LCD device. Accordingly, with respect to various kinds of LCD devices, it is possible to reliably electrically connect components to each other at low cost, and to prevent malfunction and breakdown of electro-optical panels or electronic components due to electrical noise.

While the above-mentioned embodiments or modified examples have described the liquid crystal panel or the soundgenerating unit serving as an electronic part that is received in the plastic frame 6, and the second liquid crystal panel, the invention is not limited thereto but, for example, components such as a circuit board or the like may be employed. Accordingly, with respect to various kinds of LCD devices, it is possible to reliably electrically connect components to each other at low cost, and to prevent malfunction and breakdown of electro-optical panels or electronic components due to electrical noise.

While the above-mentioned embodiments or modified examples have described the plastic frame for receiving the liquid crystal panel or the soundgenerating unit of the LCD device, the invention is not limited thereto. That is, the invention may include, for example, a metallic frame. As a result, it is possible to achieve a reliable electrical connection through the first metal frame, a receiving part, and the second metal frame.

Figure 22:
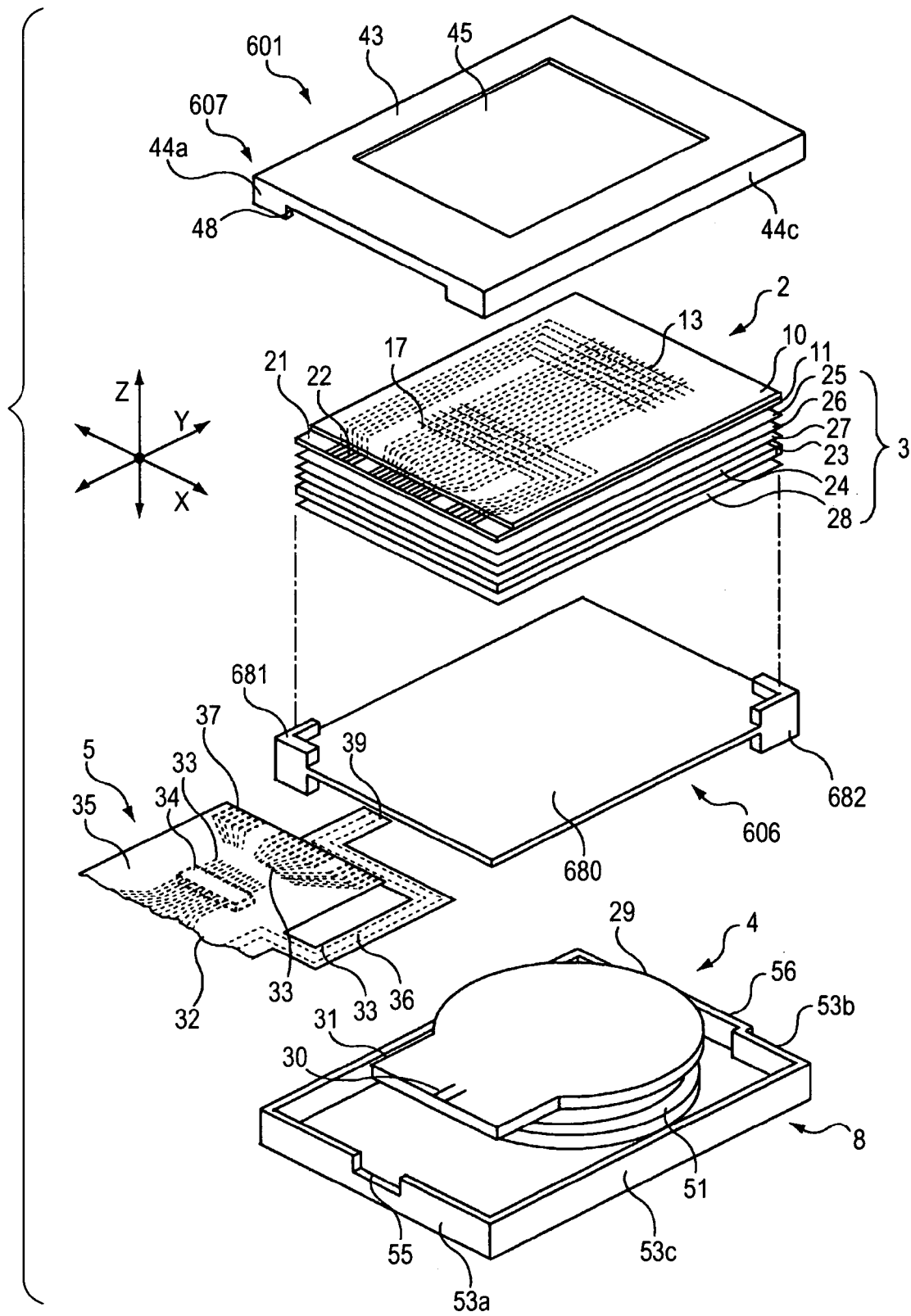
FIG. 22 is an explanatory view for showing a case where a receiving part of an LCD device does not have a circumference at its four sides.

While the above-mentioned embodiments or modified examples have described the plastic frame as a receiving part, the invention is not limited thereto. For example, as shown in FIG. 22, the receiving part may have a rectangular plate that is provided with L-shaped walls at opposite corners to guide and hold a liquid crystal panel or the like. Examples of the receiving part will now be described in detail. The same components as those of the first embodiment are denoted by the same reference numerals and a detailed description thereof will be omitted.

As shown in FIG. 22, for example, an LCD device 601 includes a liquid crystal panel 2 that is a first electro-optical panel, an illuminating unit 3 that emits light on the liquid crystal panel 2, a soundgenerating unit 4 that is provided as an electronic part to be adjacent to the liquid crystal panel 2, a flexible substrate 5 that is a circuit board electrically connected to the liquid crystal panel 2, a holding plate 606 that receives the liquid crystal panel 2 or the soundgenerating unit 4, and first and second metal frames 607 and 8 between which the holding plate 606 receiving the liquid crystal panel 2, the soundgenerating unit 4, or the like is interposed. In the LCD device 601, other components (not shown) are provided, if necessary, in addition to the first and second metal frames 607 and 8.

As shown in FIG. 22, for example, the holding plate 606 has a rectangular plate 680 that is provided with L-shaped walls 681 and 682 at opposite corners to guide and hold the liquid crystal panel 2, the illuminating unit 3, or the like.

The wall 681 is provided to be orthogonal to the plate 680 from the edges of the two sides of the plate 680 over the front and rear surfaces of the plate at the left end of the plate 680 when seen from the flexible substrate side in FIG. 22. The horizontal width of the wall 681 is shorter than the length of each of the sides. For example, the wall 681 on the flexible substrate side is formed to have the length in the X-axis direction of FIG. 22 such that the main body connecting terminal 37 of the flexible substrate 5 is electrically connected to the external terminal 22 of the liquid crystal panel 2 arranged on the plate 680 through the external ACF 38. Also, similarly to the wall 681, the wall 682 is provided at the corner (the opposite side of the flexible substrate of the drawing) of the plate 680. The walls 681 and 682 are provided such that their respective indented parts face each other.

The holding plate 606 is formed such that the illuminating unit 3 and part of the liquid crystal panel can be accurately received inside the walls 681 and 682. On the opposite side, the soundgenerating unit 4 is received inside the walls 681 and 682.

Accordingly, it is possible to easily receive the liquid crystal panel 2, the illuminating unit 3, the soundgenerating unit 4 and the like, and to simplify the construction of the receiving part. In addition, since the walls do not cover four sides of the planar plate 680, it is possible to freely connect the flexible substrate 5 to the liquid crystal panel 2.

The first metal frame 607 is the same as that of the first embodiment. However, unlike in the first embodiment, for example, as shown in FIG. 22, in the first metal frame 607, the push spring parts 46 and 47 are not provided between the opening 45 and edges of one side on the opposite side of the flexible substrate side of the planar portion 43.

The entire disclosure of Japanese Patent Application No. 2004-353657, filed Dec. 7, 2004 is expressly incorporated by reference herein.

What is claimed is:

1. An electro-optical device comprising:
    a first electro-optical panel;
    an electronic part that is provided adjacent to the first electro-optical panel;
    a receiving part that is interposed between the first electro-optical panel and the electronic part and that receives the first electro-optical panel and the electronic part;
    a first metal frame that fixes the first electro-optical panel to the receiving part; and
    a second metal frame that fixes the electronic part, the first and the second metal frames sandwiches the receiving part therebetween,
    wherein one of the first and second metal frames has an elastic conductive part that extends toward the other one of the first and second metal frames, and
    the conductive part is pressed against the other one of the first and second metal frames by the elastic force and comes into contact with the other one of the first and second metal frames such that the first and second metal frames are electrically connected to each other.

2. The electro-optical device according to claim 1, further comprising:

a circuit board that is electrically connected to the first electro-optical panel, wherein the conductive part extends from the circuit board side or the opposite side of the circuit board side of the one of the first and second metal frames toward the other one of the first and second metal frames.

3. The electro-optical device according to claim 1, wherein the conductive part is a spring.

4. The electro-optical device according to claim 3, wherein each of the first and second metal frames has a sidewall that is extended to each other, and the spring is extended from the sidewall of the one of the first and second metal frames to overlap and comes into contact with the sidewall of the other one of the first and second metal frames such that the first and second metal frames are electrically connected to each other.

5. The electro-optical device according to claim 4, wherein the sidewall of the other one of the first and second metal frames has a recess, which receives at least the spring, on an inner side or an outer side of the other sidewall, and the spring is received in the recess to come into contact with a sidewall of the recess.

6. The electro-optical device according to claim 4, wherein the conductive part includes a plurality of springs which are extended from the sidewall of the one of the first and second metal frames.

7. The electro-optical device according to claim 4, wherein the spring is a plate spring that bends toward the sidewall of the other one of the first and second metal frames.

8. The electro-optical device according to claim 4, wherein a part of the sidewall of the one of the first and second metal frames extends toward the other one of the first and second metal frames, the spring is a plate spring which is formed by cutting and bending the extended part from the sidewall of the one of the first and second metal frames.

9. The electro-optical device according to claim 1, wherein the electronic part is a soundgenerating unit.

10. The electro-optical device according to claim 1, wherein the electronic part is a second electro-optical panel, and a display side of the second electro-optical panel and a display side of the first electro-optical panel are facing opposite direction.

11. An electronic apparatus comprising the electro-optical device according to claim 1.

* * * * *